(12) United States Patent
Ishihara

(10) Patent No.: US 6,943,927 B1
(45) Date of Patent: Sep. 13, 2005

(54) OPTICAL SCANNING APPARATUS, MULTI-BEAM OPTICAL SCANNING APPARATUS, AND IMAGE-FORMING APPARATUS

(75) Inventor: Keiichiro Ishihara, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 80 days.

(21) Appl. No.: 09/696,000

(22) Filed: Oct. 26, 2000

(30) Foreign Application Priority Data

Oct. 29, 1999 (JP) .......................................... 11-308896

(51) Int. Cl.⁷ .............................................. G02B 26/08
(52) U.S. Cl. ........................ 359/205; 359/207; 359/216; 347/259
(58) Field of Search ................................ 359/212–219, 359/205–207, 662; 347/256, 258–261

(56) References Cited

U.S. PATENT DOCUMENTS

| | | | |
|---|---|---|---|
| 5,025,268 A | 6/1991 | Arimoto et al. | ............ 346/108 |
| 5,189,546 A | 2/1993 | Iizuka | ......................... 359/217 |
| 5,418,639 A * | 5/1995 | Yamazaki | ................... 359/216 |
| 5,488,502 A | 1/1996 | Saito | ......................... 359/205 |
| 5,600,476 A | 2/1997 | Takada et al. | |
| 5,818,505 A | 10/1998 | Kato | |
| 5,883,732 A | 3/1999 | Takada et al. | |
| 6,133,935 A | 10/2000 | Fujibayashi et al. | |
| 6,347,004 B1 * | 2/2002 | Suzuki et al. | ............... 359/205 |

FOREIGN PATENT DOCUMENTS

| | | |
|---|---|---|
| EP | 0 730 182 | 9/1996 |
| EP | 0 735 742 | 10/1996 |
| JP | 7-113950 | 5/1995 |
| JP | 08-297256 | 11/1996 |
| JP | 10-90620 | 4/1998 |
| JP | 10-232347 | 9/1998 |

* cited by examiner

Primary Examiner—James Phan
(74) Attorney, Agent, or Firm—Fitzpatrick, Cella, Harper & Scinto

(57) ABSTRACT

Provided are compact, high-definition, optical scanning apparatus and multi-beam scanning apparatus capable of keeping the spot size uniform in the sub-scanning direction throughout the entire, effective scanning area on a surface to be scanned. An optical scanning apparatus has an entrance optical system 11 for guiding light emitted from a light source 1, to a deflector 5, and a scanning optical system 6 for focusing the light reflectively deflected by the deflector, on a surface to be scanned 7. In the optical scanning apparatus, the scanning optical system has a plurality of sagittal asymmetric change surfaces in which curvatures in the sagittal direction change on an asymmetric basis in the meridional direction with respect to the optical axis of the scanning optical system.

9 Claims, 13 Drawing Sheets

OPTICAL SCANNING APPARATUS, MULTI-BEAM OPTICAL SCANNING APPARATUS, AND IMAGE-FORMING APPARATUS

BACKGROUND OF THE INVENTION

1. Field of the Invention

The present invention relates to optical scanning apparatus and multi-beam optical scanning apparatus and, particularly, the invention is suitably applicable to image-forming apparatus, for example, such as laser beam printers involving the electrophotographic process, digital copiers, and the like, constructed so as to record image information by reflectively deflecting light from light source means by deflecting means to optically scan a surface to be scanned, via scanning optical means with the light.

2. Related Background Art

In the optical scanning apparatus such as the laser beam printers, the digital copiers, etc. heretofore, the image information was recorded in such a manner that the light optically modulated according to an image signal and outputted from the light source means was periodically deflected by the deflecting means which consisted of, for example, a polygon mirror, and was converged in a spot shape on a surface of a photosensitive recording medium by the scanning optical means with the fθ characteristics to optically scan the surface.

FIG. 13 is a schematic diagram to show the principal part of a conventional, optical scanning apparatus. In the same figure a diverging beam emitted from the light source means 91 is converted into a nearly parallel beam by a collimator lens 92 and the nearly parallel beam is restricted in the beam width by a stop 93 to enter a cylindrical lens 94 having a predetermined power only in the sub-scanning direction. The nearly parallel beam entering the cylindrical lens 94 emerges in the state of the nearly parallel beam in the main scanning section as it is. In the sub-scanning section the beam is converged to be focused into an almost linear image on a deflection facet (reflective surface) 95a of an optical deflector 95 consisting of a polygon mirror. Then the scanning optical means (fθ lens system) 96 with the fθ characteristics guides the beam reflectively deflected by the deflection facet 95a of the optical deflector 95, via a return mirror 98 to a surface of photosensitive drum 97 as a surface to be scanned. The optical deflector 95 is rotated at nearly equal angular velocity, whereby the beam scans the surface to be scanned 97 at almost constant speed to record the image information thereon.

To make the apparatus from the optical deflector 95 to the surface to be scanned 97 more compact, it is necessary to effect good correction for optical performance of the fθ lens 96 throughout wide angles of view. For example, Japanese Patent Application Laid-Open No. 7-113950 discloses an example of correction for curvature of field (image positions) in the sub-scanning direction and at wide angles of view by provision of only one surface wherein curvatures in the sagittal direction vary on an asymmetric basis with respect to the optical axis and wherein magnitude relations of curvatures in the sagittal direction are different on the upper and lower sides of the optical axis.

There was, however, the problem that nonuniformity of lateral magnification (which will also be referred to hereinafter as "sub-scanning magnification") in the sub-scanning direction appeared prominent at wide angles of view and even if the image positions in the sub-scanning direction were corrected the spot size would vary in proportion to sub-scanning magnifications at respective scanning positions. Further, in the case of the optical scanning apparatus using multiple beams, they suffered from the problem that with deviation of the sub-scanning magnifications from a fixed value, line pitch intervals in the sub-scanning direction varied at every scanning position on the surface to be scanned during the optical scanning of that surface, so as to result in irregular pitch.

The scanning optical means needs to be located near the optical deflector in order to decrease the cost by decreasing the size of the lens. However, there was the problem that it increased the sub-scanning magnification and the asymmetry of the image positions in the sub-scanning direction and the asymmetry of the sub-scanning magnifications appeared more prominent.

An object of the present invention is to provide a compact, high-definition, optical scanning apparatus with wide angles of view capable of effecting good correction for curvature of field (image positions) in the sub-scanning direction and correction to keep the sub-scanning magnification at a fixed value, by constructing the scanning optical means of a plurality of sagittal asymmetric change surfaces and properly setting the shape of each lens.

Another object of the present invention is to provide a compact, high-definition, multi-beam optical scanning apparatus with wide angles of view capable of keeping line pitch intervals in the sub-scanning direction constant throughout the entire, effective scanning area, by constructing the scanning optical means of a plurality of sagittal asymmetric change surfaces and properly setting the shape of each lens.

SUMMARY OF THE INVENTION

A scanning optical apparatus according to one aspect of the invention is an optical scanning apparatus comprising entrance optical means for guiding light emitted from light source means, to deflecting means, and scanning optical means for focusing the light reflectively deflected by the deflecting means, on a surface to be scanned, wherein the scanning optical means comprises a plurality of sagittal asymmetric change surfaces in which curvatures in the sagittal direction change on an asymmetric basis in the meridional direction with respect to the optical axis of the scanning optical means.

In the optical scanning apparatus according to another aspect of the invention, said sagittal asymmetric change surfaces comprise two or more sagittal modification surfaces in which magnitude relation differs among curvatures in the sagittal direction at respective positions in the meridional direction with respect to the optical axis.

In the optical scanning apparatus according to another aspect of the invention, said sagittal deformation surfaces comprise two or more surfaces in which the curvatures in the sagittal direction at the respective positions in the meridional direction with respect to the optical axis become large or small on the same side.

In the optical scanning apparatus according to another aspect of the invention, in at least one surface of said sagittal deformation surfaces the curvatures in the sagittal direction become large on the side of said light source means with respect to the optical axis.

In the optical scanning apparatus according to another aspect of the invention, in at least one surface of said sagittal asymmetric change surfaces the curvatures in the sagittal direction have an inflection point only on one side in the meridional direction with respect to the optical axis.

In the optical scanning apparatus according to another aspect of the invention, said scanning optical means comprises a plurality of fθ lenses, an fθ lens located closest to the deflecting means out of said plurality of fθ lenses has a negative, refractive power in the sub-scanning direction, and an fθ lens located closest to the surface to be scanned has a positive, refractive power in the sub-scanning direction.

In the optical scanning apparatus according to another aspect of the invention, all lens surfaces of said plurality of fθ lenses are formed in a concave shape opposed to said deflecting means.

In the optical scanning apparatus according to another aspect of the invention, the following condition is satisfied:

$$k/W \leq 0.6$$

where k is an fθ coefficient of said scanning optical means and W an effective scanning width on said surface to be scanned.

In the optical scanning apparatus according to another aspect of the invention, the following condition is satisfied:

$$|\beta_s| \geq 2$$

where $\beta_s$ is a lateral magnification in the sub-scanning direction of said scanning optical means.

A multi-beam optical scanning apparatus according to a further aspect of the invention is a multi-beam optical scanning apparatus comprising light source means having a plurality of light-emitting regions, entrance optical means for guiding a plurality of beams emitted from the light source means, to deflecting means, and scanning optical means for focusing the plurality of beams reflectively deflected by the deflecting means, on a surface to be scanned, wherein said scanning optical means comprises a plurality of sagittal asymmetric change surfaces in which curvatures in the sagittal direction change on an asymmetric basis in the meridional direction with respect to the optical axis of the scanning optical means.

In the multi-beam optical scanning apparatus according to another aspect of the invention, said sagittal asymmetric change surfaces comprise two or more sagittal modification surfaces in which magnitude relation differs among curvatures in the sagittal direction at respective positions in the meridional direction with respect to the optical axis.

In the multi-beam optical scanning apparatus according to another aspect of the invention, said sagittal deformation surfaces comprise two or more surfaces in which the curvatures in the sagittal direction at the respective positions in the meridional direction with respect to the optical axis become large or small on the same side.

In the multi-beam optical scanning apparatus according to another aspect of the invention, in at least one surface of said sagittal deformation surfaces the curvatures in the sagittal direction become large on the side of said light source means with respect to the optical axis.

In the multi-beam optical scanning apparatus according to another aspect of the invention, in at least one surface of said sagittal asymmetric change surfaces the curvatures in the sagittal direction have an inflection point only on one side in the meridional direction with respect to the optical axis.

In the multi-beam optical scanning apparatus according to another aspect of the invention, said scanning optical means comprises a plurality of fθ lenses, an fθ lens located closest to the deflecting means out of said plurality of fθ lenses has a negative, refractive power in the sub-scanning direction, and an fθ lens located closest to the surface to be scanned has a positive, refractive power in the sub-scanning direction.

In the multi-beam optical scanning apparatus according to another aspect of the invention, all lens surfaces of said plurality of fθ lenses are formed in a concave shape opposed to said deflecting means.

In the multi-beam optical scanning apparatus according to another aspect of the invention, the following condition is satisfied:

$$k/W \leq 0.6$$

where k is an fθ coefficient of said scanning optical means and W an effective scanning width on said surface to be scanned.

In the multi-beam optical scanning apparatus according to another aspect of the invention, the following condition is satisfied:

$$|\beta_s| \geq 2$$

where $\beta_s$ is a lateral magnification in the sub-scanning direction of said scanning optical means.

An image-forming apparatus according to a further aspect of the invention is an image-forming apparatus comprising the scanning optical apparatus as set forth, a photosensitive body located at said surface to be scanned, a developing unit for developing an electrostatic, latent image formed on said photosensitive body with the light under scan by said scanning optical apparatus, into a toner image, a transfer unit for transferring said developed toner image onto a transfer medium, and a fixing unit for fixing the transferred toner image on the transfer medium.

Another image-forming apparatus according to a further aspect of the present invention is an image-forming apparatus comprising the scanning optical apparatus as set forth, and a printer controller for converting code data supplied from an external device, into an image signal and supplying the image signal to said scanning optical apparatus.

DETAILED DESCRIPTION OF THE PREFERRED EMBODIMENTS

Embodiment 1

Figure 1:
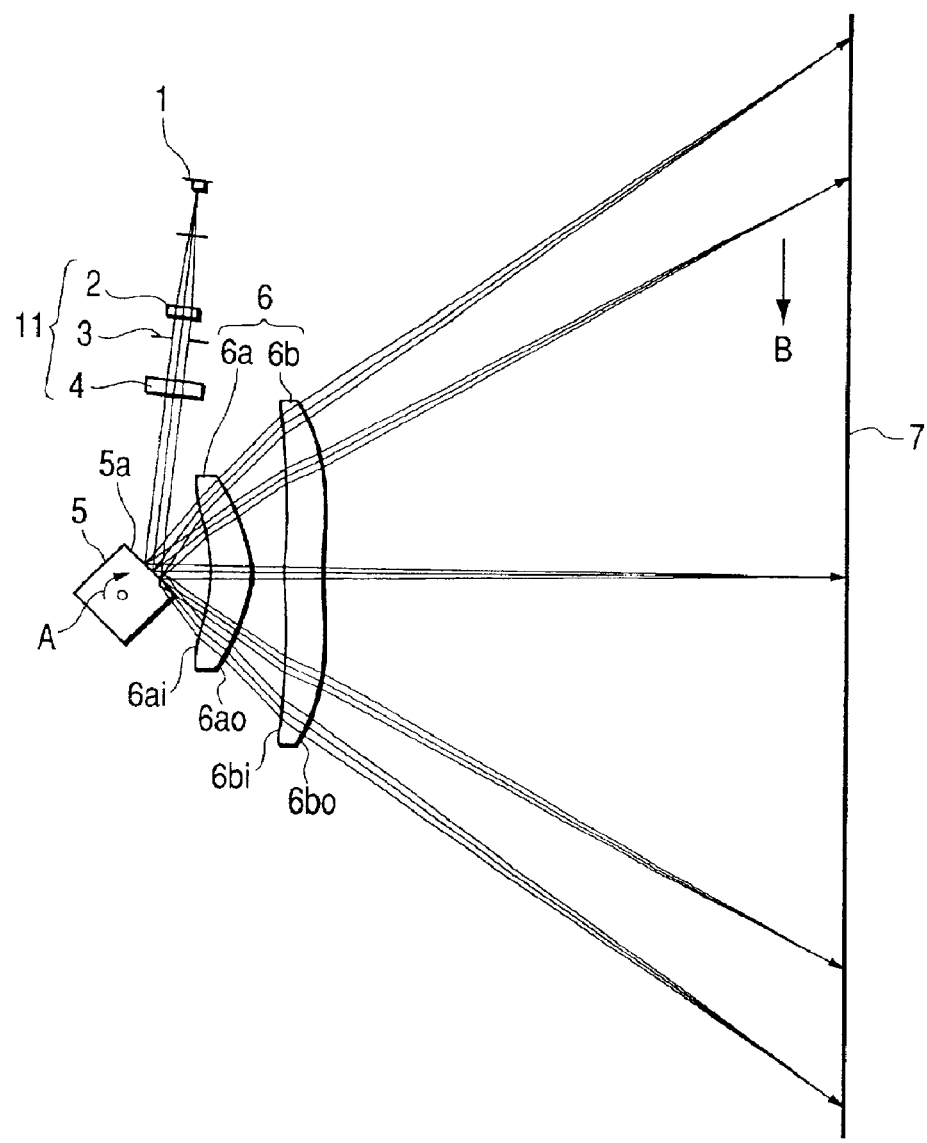
FIG. 1 is a cross-sectional view along the main scanning direction of the optical scanning apparatus in Embodiment 1 of the present invention.
Figure 2:
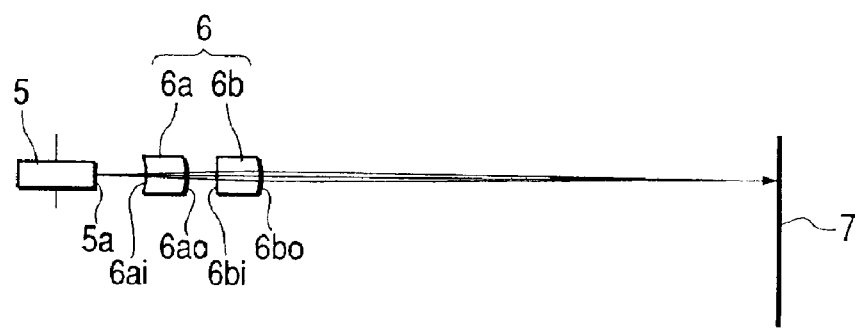
FIG. 2 is a cross-sectional view along the sub-scanning direction of the optical scanning apparatus in Embodiment 1 of the present invention.

FIG. 1 is a cross-sectional view of the principal part along the main scanning direction (a main scanning section) of the optical scanning apparatus in Embodiment 1 of the present invention and FIG. 2 is a cross-sectional view of the principal part along the sub-scanning direction (a sub-scanning section) of FIG. 1.

In the present specification the main scanning direction (meridional direction) is defined along the direction into which the light is reflectively deflected (or deflected to scan) by the deflecting means, and the sub-scanning direction (sagittal direction) along the direction perpendicular to the optical axis of the scanning optical means and to the main scanning direction.

In the figures, numeral 1 designates a light source means, which is comprised, for example, of a semiconductor laser. Numeral 2 denotes a collimator lens (condenser lens), which converts a diverging beam (light beam) emitted from the light source means 1 into a nearly parallel beam. Numeral 3 represents an aperture stop, which limits passing light (amount of light). Numeral 4 indicates a cylindrical lens (anamorphic lens), which has a predetermined power only in the sub-scanning direction and which focuses the beam having passed the aperture stop 3 in an almost linear image on a deflection facet (reflective surface) 5a of an optical deflector 5 described hereinafter, in the sub-scanning section. Each of the elements including the collimator lens 2, the aperture stop 3, the cylindrical lens 4, and so on constitutes an element of entrance optical means 11.

Numeral 5 denotes the optical deflector as the deflecting means, which is comprised, for example, of a polygon mirror (rotary polygon mirror) and which is rotated at a fixed speed in the direction of arrow A in the drawing by a driving means such as a motor or the like (not illustrated).

Numeral 6 denotes the scanning optical means having the converging function and the fθ characteristics, which has first and second fθ lenses (scanning lenses) 6a, 6b of the shape described hereinafter, which focuses the beam based on the image information, which was reflectively deflected by the optical deflector 5, on a photosensitive drum surface 7 as a surface to be scanned, and which has an inclination correcting function by keeping the deflection facet 5a of the optical deflector 5 in conjugate with the surface to be scanned 7 in the sub-scanning section. In the scanning optical means 6 the first fθ lens 6a on the side of optical deflector 5 has a negative, refractive power in the sub-scanning direction and the second fθ lens 6b on the side of the surface to be scanned 7 has a positive, refractive power in the sub-scanning direction.

Numeral 7 represents a surface of a photosensitive drum (a surface of an image carrier) as a surface to be scanned.

In the present embodiment the diverging beam emitted from the semiconductor laser 1 is converted into a nearly parallel beam by the collimator lens 2 and the beam (amount of light) is limited by the aperture stop 3 to enter the cylindrical lens 4. The nearly parallel beam entering the cylindrical lens 4 emerges in the as-entering state in the main scanning section. In the sub-scanning section the beam is converged to be focused as an almost linear image (a linear image longitudinal in the main scanning direction) on the deflection facet 5a of the optical deflector 5. Then the beam reflectively deflected by the deflection facet 5a of the optical deflector 5 travels through the first fθ lens 6a and the second fθ lens 6b to be focused in a spot shape on the surface of the photosensitive drum 7. The optical deflector 5 is rotated in the direction of arrow A, whereby the beam optically scans the surface of the photosensitive drum 7 at an equal speed in the direction of arrow B (in the main scanning direction). This causes an image to be recorded on the photosensitive drum surface 7 as a recording medium.

Figure 3:
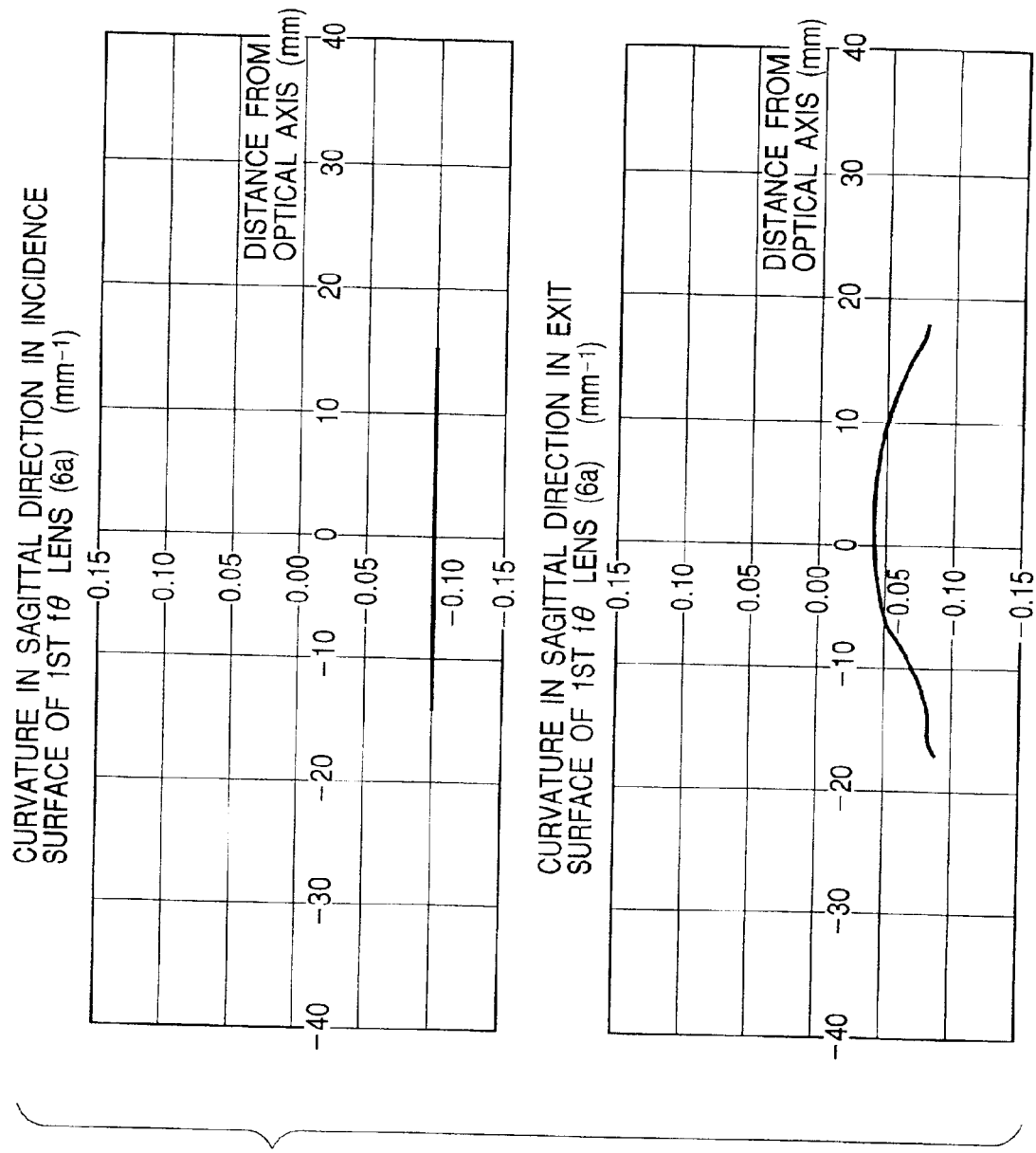
FIG. 3 is a diagram to show change in curvatures in the sagittal direction in each of surfaces of the scanning optical means in Embodiment 1 of the present invention.
Figure 4:
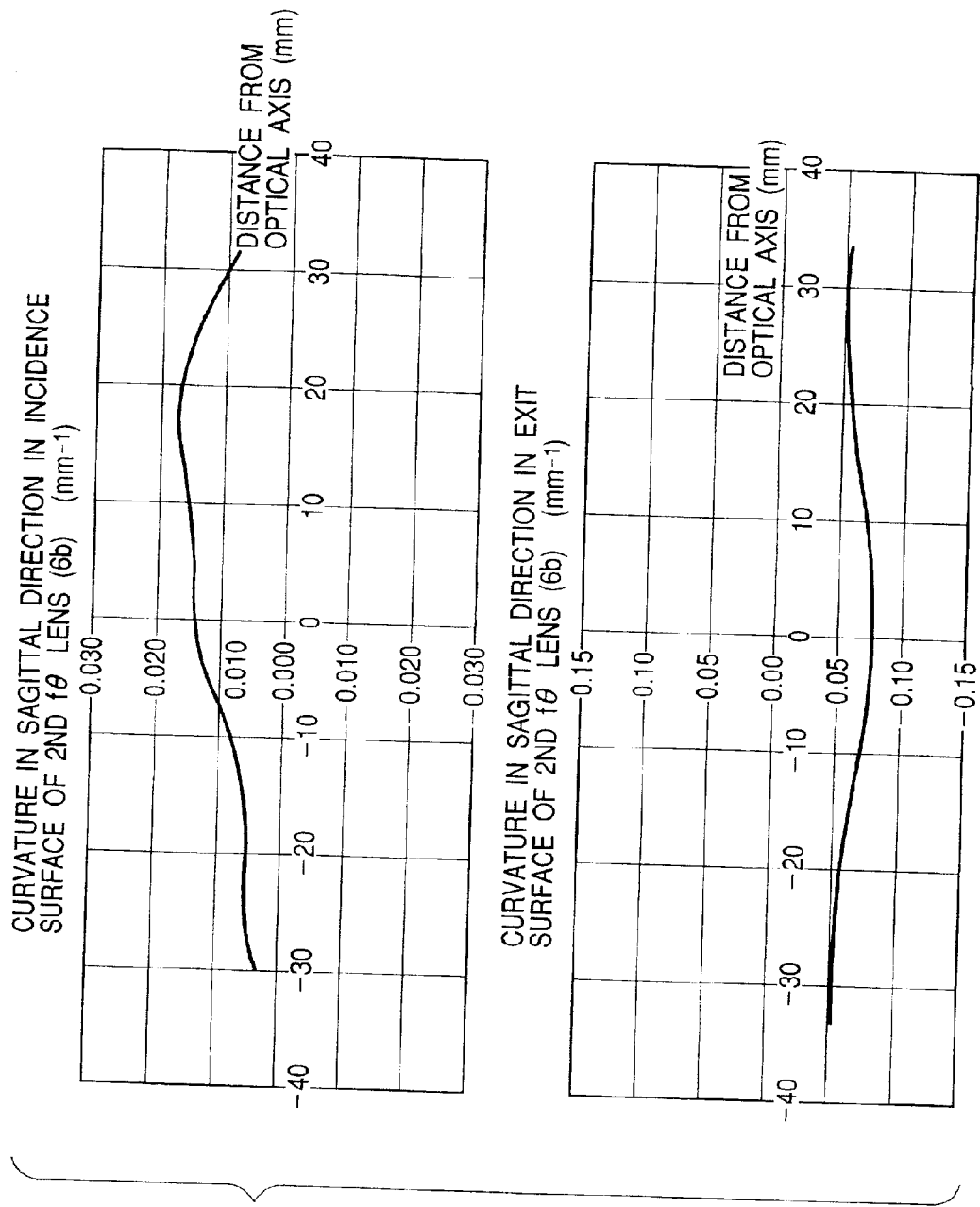
FIG. 4 is a diagram to show change in curvatures in the sagittal direction in each of surfaces of the scanning optical means in Embodiment 1 of the present invention.

The optical layout of the scanning optical means 6 and aspherical coefficients of the first and second fθ lenses 6a, 6b in the present embodiment are presented in Table 1 and Table 2, respectively. FIG. 3 and FIG. 4 are drawings to show how curvatures in the sagittal direction vary in each of surfaces of the first and second fθ lenses 6a, 6b, respectively, in the present embodiment.

TABLE 1

| LAYOUT OF OPTICAL SCANNING APPARATUS | | |
|---|---|---|
| fθ COEFFICIENT (mm/rad) | | |
| fθ COEFFICIENT | k | 109 |
| WAVELENGTH, REFRACTIVE INDEX | | |
| WAVELENGTH USED | λ (nm) | 780 |
| fθ LENS 6a REFRACTIVE INDEX | N1 | 1.5242 |
| fθ LENS 6b REFRACTIVE INDEX | N2 | 1.5242 |
| PLACEMENT OF IMAGING OPTICAL SYSTEM (mm) | | |
| REFLECTIVE SURFACE OF POLYGON MIRROR 5a - LENS 6a INCIDENCE SURFACE 6ai | d1 | 10.50 |
| LENS 6a INCIDENCE SURFACE 6ai - LENS 6a EXIT SURFACE 6ao | d2 | 7.05 |
| LENS 6a EXIT SURFACE 6ao - LENS 6b INCIDENCE SURFACE 6bi | d3 | 6.45 |
| LENS 6b INCIDENCE SURFACE 6bi - LENS 6b EXIT SURFACE 6bo | d4 | 7.55 |
| LENS 6b EXIT SURFACE 6bo - SURFACE TO BE SCANNED 7 | d5 | 102.45 |
| EFFECTIVE SCAN WIDTH (mm) | W | 214 |
| k/W | k/W | 0.51 |
| SUB-SCANNING MAGNIFICATION | βs | 3.3 |

TABLE 2

LAYOUT OF OPTICAL SCANNING APPARATUS

| fθ LENS 6a MERIDIONAL SHAPE | | | | fθ LENS 6b MERIDIONAL SHAPE | | |
|---|---|---|---|---|---|---|
| | INCIDENCE SURFACE 6ai ON THE LIGHT SOURCE SIDE | EXIT SURFACE 6ao ON THE LIGHT SOURCE SIDE | | INCIDENCE SURFACE 6bi ON THE LIGHT SOURCE SIDE | EXIT SURFACE 6bo ON THE LIGHT SOURCE SIDE | |
| R | −3.02877E+01 | −2.16472E+01 | R | 8.14379E+01 | 7.96757E+01 | |
| K | −2.52957E+00 | −1.20217E+00 | K | −6.69965E+00 | −1.39708E−01 | |
| B4 | 3.61254E−05 | 1.57451E−05 | B4 | −1.46498E−05 | −2.14482E−05 | |
| B6 | −8.09230E−08 | 3.57693E−08 | B6 | 1.26772E−08 | 2.47677E−08 | |
| B8 | 0.00000E+00 | −1.12626E−10 | B8 | −1.36311E−12 | −2.71180E−11 | |
| B10 | 0.00000E+00 | 0.00000E+00 | B10 | −2.45186E−15 | 2.06855E−14 | |
| B12 | 0.00000E+00 | 0.00000E+00 | B12 | 0.00000E+00 | −6.92697E−18 | |
| | ON THE OTHER SIDE | ON THE OTHER SIDE | | ON THE OTHER SIDE | ON THE OTHER SIDE | |
| R | −3.02877E+01 | −2.16472E+01 | R | 8.14379E+01 | 7.96757E+01 | |
| K | −2.52957E+00 | −1.20217E+00 | K | −6.69965E+00 | −1.39708E−01 | |
| B4 | 3.61254E−05 | 1.49085E−05 | B4 | −1.63400E−05 | −2.24876E−05 | |
| B6 | −8.09230E−08 | 4.08194E−08 | B6 | 1.64210E−08 | 2.67132E−08 | |
| B8 | 0.00000E+00 | −1.20672E−10 | B8 | −4.36204E−12 | −2.94646E−11 | |
| B10 | 0.00000E+00 | 0.00000E+00 | B10 | −2.17220E−15 | 2.28464E−14 | |
| B12 | 0.00000E+00 | 0.00000E+00 | B12 | 0.00000E+00 | −8.12057E−18 | |

| fθ LENS 6a SAGITTAL SHAPE | | | | fθ LENS 6b SAGITTAL SHAPE | | |
|---|---|---|---|---|---|---|
| | INCIDENCE SURFACE 6ai ON THE LIGHT SOURCE SIDE | EXIT SURFACE 6ao ON THE LIGHT SOURCE SIDE | | INCIDENCE SURFACE 6bi ON THE LIGHT SOURCE SIDE | EXIT SURFACE 6bo ON THE LIGHT SOURCE SIDE | |
| r | −1.00000E+01 | −2.32587E+01 | r | 7.18760E+01 | −1.26284E+01 | |
| D2 | 0.00000E+00 | −1.48301E−03 | D2 | −1.19364E−03 | 1.44964E−03 | |
| D4 | 0.00000E+00 | −2.46682E−06 | D4 | 1.96871E−06 | −2.17689E−06 | |
| D6 | 0.00000E+00 | 4.91740E−09 | D6 | −1.63328E−10 | 2.44849E−09 | |
| D8 | 0.00000E+00 | 1.13169E−11 | D8 | −1.09555E−13 | −1.26980E−12 | |
| D10 | 0.00000E+00 | −1.90462E−15 | D10 | 1.42201E−16 | 8.86595E−17 | |
| D12 | 0.00000E+00 | 0.00000E+00 | D12 | 0.00000E+00 | 0.00000E+00 | |
| | ON THE OTHER SIDE | ON THE OTHER SIDE | | ON THE OTHER SIDE | ON THE OTHER SIDE | |
| r | −1.00000E+01 | −2.32587E+01 | r | 7.18760E+01 | −1.26284E+01 | |
| D2 | 0.00000E+00 | −6.74273E−03 | D2 | 7.86075E−03 | 1.44964E−03 | |
| D4 | 0.00000E+00 | 3.13732E−05 | D4 | −1.20370E−05 | −2.17689E−06 | |
| D6 | 0.00000E+00 | −4.91023E−08 | D6 | 2.30753E−09 | 2.44849E−09 | |
| D8 | 0.00000E+00 | −1.96138E−12 | D8 | 1.30133E−12 | −1.26980E−12 | |
| D10 | 0.00000E+00 | −4.27397E−16 | D10 | 4.58193E−15 | 8.86595E−17 | |
| D12 | 0.00000E+00 | 0.00000E+00 | D12 | 0.00000E+00 | 0.00000E+00 | |

In the present embodiment each of meridional lens shapes of the first and second fθ lenses 6a, 6b is comprised of an aspherical shape that can be expressed as a function up to degree 12. For example, let us define the origin at an intersection between the optical axis and the first or second fθ lens 6a, 6b, take the X-axis along the direction of the optical axis, and take the Y-axis along an axis perpendicular to the optical axis in the main scanning section. Then the shapes in the meridional direction corresponding to the main scanning direction are expressed by the following equation.

$$X = (Y^2/R)/[1+\{1-(1+k)(Y/R)^2\}^{1/2}] + B4 \times Y^4 + B6 \times Y^6 + B8 \times Y^8 + B10 \times Y^{10} + B12 \times Y^{12}$$

(where R is a radius of curvature in the meridional direction and on the optical axis, and k, B4, B6, B8, B10, and B12 are the aspherical coefficients).

Sagittal lines of each lens surface continuously change their radii of curvatures with change in coordinates on the lens surface in the main scanning direction. The radius $R_s^*$ of the curvature of the sagittal line at the position where the coordinate is Y in the main scanning direction, is expressed by the following equation.

$$R_s^* = R_s \times (1 + D2 \times Y^2 + D4 \times Y^4 + D6 \times Y^6 + D8 \times Y^8 + D10 \times Y^{10})$$

(where $R_s$ is the radius of the curvature in the sagittal direction and on the optical axis, and D2, D4, D6, D8, and D10 are coefficients).

In the present embodiment the first fθ lens 6a is a positive meniscus lens with a concave surface opposed to the polygon mirror 5 in the main scanning section and a negative meniscus lens with a concave surface opposed to the polygon mirror 5 in the sub-scanning section.

The second fθ lens 6b is a positive meniscus lens with a convex surface opposed to the polygon mirror 5 in the main scanning section and a double-convex lens with a convex surface opposed to the polygon mirror 5 and the other convex surface to the surface to be scanned 7 in the sub-scanning section.

In the incidence surface 6ai of the first fθ lens 6a, the surfaces in the main scanning and sub-scanning directions both are symmetric in the main scanning direction with respect to the optical axis, and the surface consists of a surface of a constant curvature in the sagittal direction (hereinafter also referred to as "sagittal curvature") normal to the meridional line in the main scanning section.

In the exit surface 6ao of the first fθ lens 6a, the surface in the main scanning direction is asymmetric with respect to the optical axis, and the surface in the sub-scanning direction consists of a sagittal asymmetric change surface in which curvatures in the sagittal direction change on an asymmetric basis in the main scanning direction with respect to the optical axis.

In the incidence surface 6bi of the second fθ lens 6b, the surface in the main scanning direction is asymmetric with respect to the optical axis, and the surface in the sub-scanning direction consists of a sagittal asymmetric change surface in which curvatures in the sagittal direction change on an asymmetric basis in the main scanning direction with respect to the optical axis.

In the exit surface 6bo of the second fθ lens 6b, the surface in the main scanning direction is asymmetric with respect to the optical axis, and the surface in the sub-scanning direction consists of a surface in which curvatures in the sagittal direction increase on a symmetric basis in the main scanning direction on either side of the optical axis.

Figure 5:
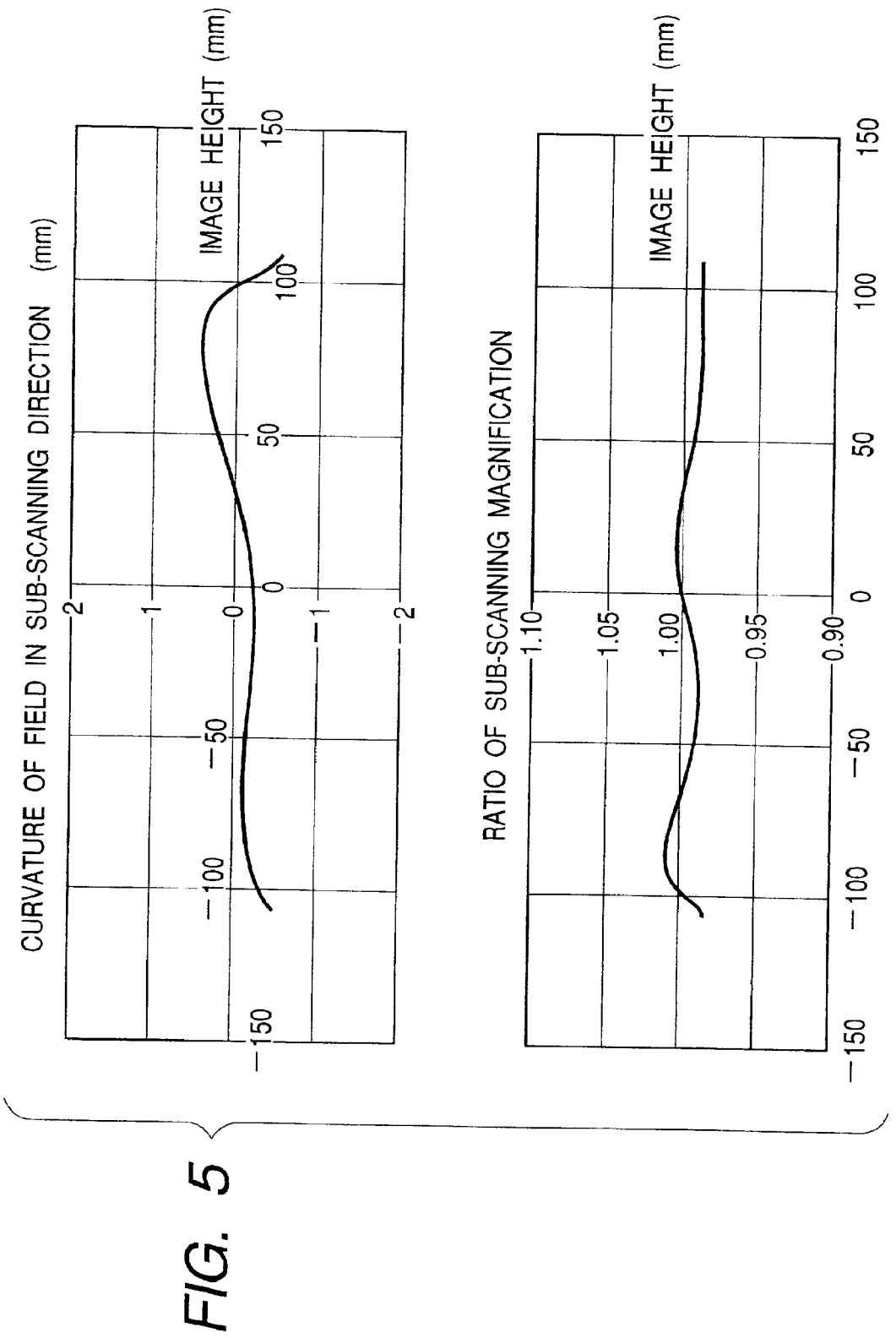
FIG. 5 is an aberration diagram of the scanning optical means in Embodiment 1 of the present invention.
Figure 6:
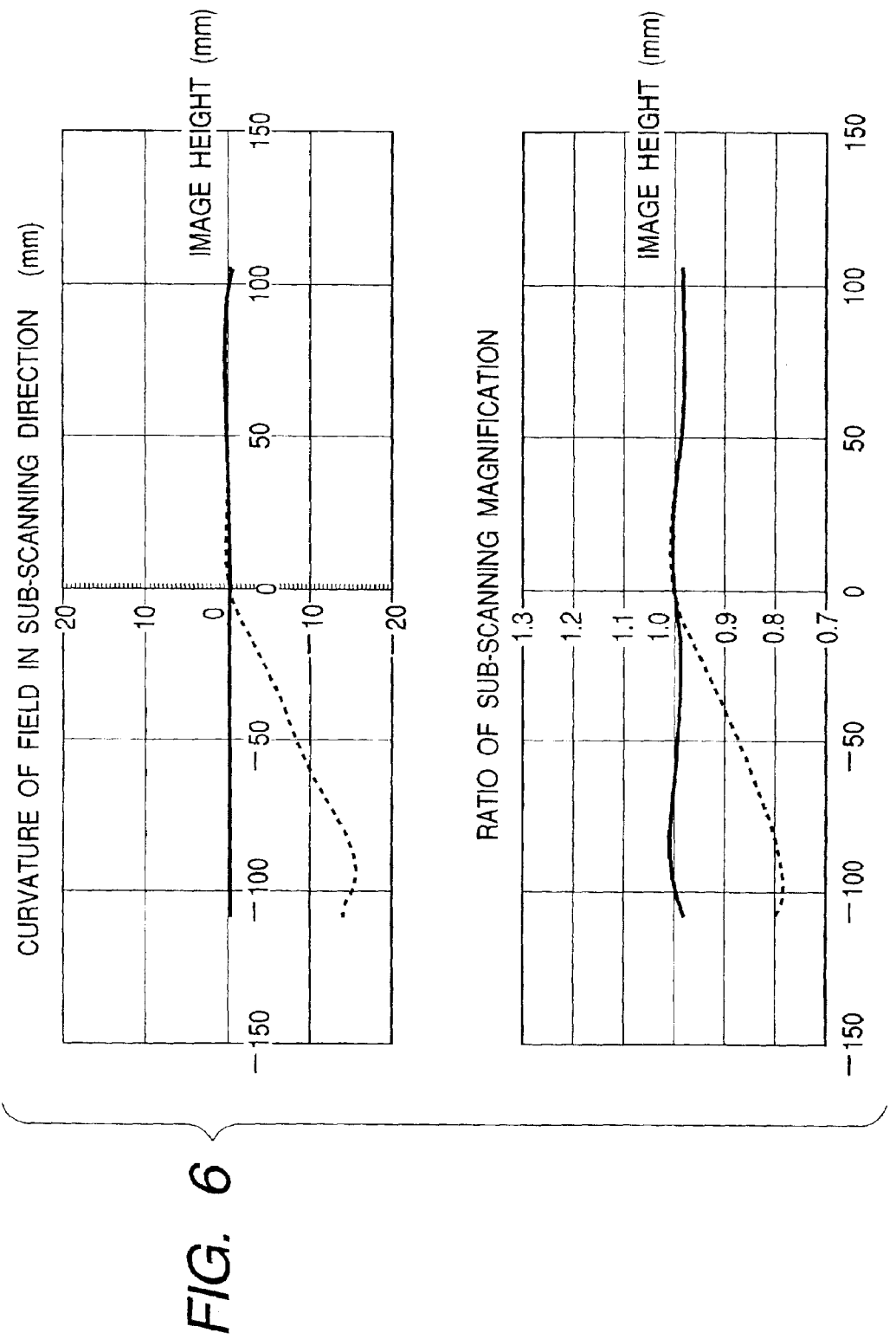
FIG. 6 is an aberration diagram of the scanning optical means in Embodiment 1 of the present invention, and a comparative example.

FIG. 5 is an aberration diagram to show the curvature of field in the sub-scanning direction and ratios of sub-scanning magnifications of the optical scanning apparatus in the present embodiment. FIG. 6 is a diagram to show the curvature of field in the sub-scanning direction and ratios of sub-scanning magnifications in the present embodiment (solid lines) and a comparative example (dashed lines) wherein curvatures in the sagittal direction on the anti-source side (i.e., on the other side than the side of the light source means 1 with respect to the optical axis of the scanning optical means 6) are equal to those on the light source side (i.e., on the same side as the light source means 1 with respect to the optical axis of the scanning optical means 6) so that the curvatures in the sagittal direction of the scanning optical means 6 in the present embodiment are symmetric in the main scanning direction with respect to the optical axis in all the four surfaces.

It is seen from FIG. 5 and FIG. 6 that the curvature of field in the sub-scanning direction and the asymmetry of sub-scanning magnifications are corrected well in the present embodiment.

In the present embodiment, where the fθ coefficient of the scanning optical means 6 is k and the effective scanning width on the surface to be scanned 7 is W, the following condition is satisfied:

$k/w \leq 0.6$.

When the lateral magnification in the sub-scanning direction of the scanning optical means 6 is $\beta_s$, the following condition is satisfied:

$|\beta_s|?2$.

In the present embodiment the fθ coefficient of the scanning optical means 6 is set to k=109 (mm/rad), the effective scanning width on the surface to be scanned 7 to W=214 mm, the angles of view to the wide angles of view over ±56°, and the sub-scanning magnification to $|\beta_s|$3.3.

In general, in the optical scanning apparatus, when the light emitted from the light source means is reflectively deflected at the deflection facet of the polygon mirror, the position of reflection varies depending upon angles of view and deviation of the reflection position is asymmetric with respect to the optical axis of the scanning optical means. This makes the image positions asymmetric in the main scanning and sub-scanning directions and also makes the sub-scanning magnifications asymmetric. In the case wherein the angles of view are the wide angles of view over ±47° and the sub-scanning magnifications ($|\beta_s| \geq 2$) are high as in the present embodiment, the asymmetry of the sub-scanning magnifications and the curvature of field (image positions) in the sub-scanning direction appears more prominent.

In the present embodiment the scanning optical means 6 is thus constructed of the combination of the surfaces wherein the curvatures in the sagittal direction change on an asymmetric basis as described above, whereby the asymmetry of the sub-scanning magnifications and the curvature of field (image positions) in the sub-scanning direction can be corrected well even in the case of the wide angles of view and the high sub-scanning magnifications. This permits the spot size in the sub-scanning direction to be kept constant at all the scanning positions in the effective scanning area on the surface to be scanned.

In the present embodiment, as described above, the scanning optical means 6 is thus constructed of the plurality of sagittal asymmetric change surfaces and the shape of each lens is properly set, whereby the curvature of field is corrected well in the sub-scanning direction while the image magnifications in the sub-scanning direction are corrected into a constant value, so as to make the spot size uniform in the sub-scanning direction.

In the present embodiment the scanning optical means 6 was constructed of the two fθ lenses 6a, 6b, but the present invention is not limited to this example; for example, the present invention can also be applied to configurations in which the scanning optical means 6 is composed of one fθ lens or of three or more fθ lenses, similarly as in above Embodiment 1.

Embodiment 2

Described next is the multi-beam optical scanning apparatus in Embodiment 2 of the present invention.

The present embodiment is different from above Embodiment 1 in that the light source means 1 is comprised of a multi-beam semiconductor laser consisting of two light-emitting regions and in that degrees of change are different for the curvatures in the sagittal direction in the surfaces of the first and second fθ lenses 6a, 6b constituting the scanning optical means 6. The other structure and optical action are substantially the same as in Embodiment 1, thereby achieving like effect.

Figure 7:
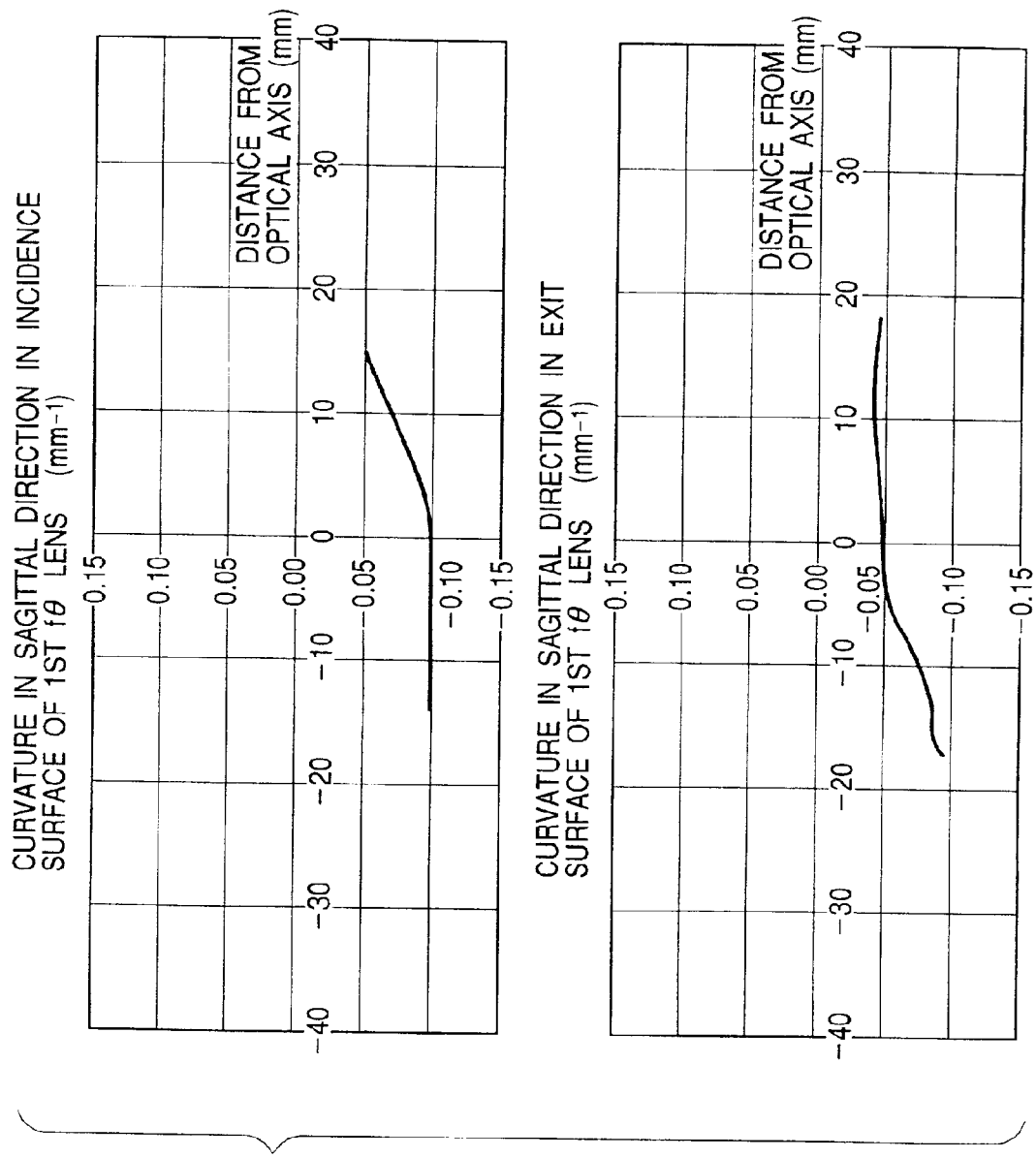
FIG. 7 is a diagram to show change in curvatures in the sagittal direction in each of surfaces of the scanning optical means in Embodiment 2 of the present invention.
Figure 8:
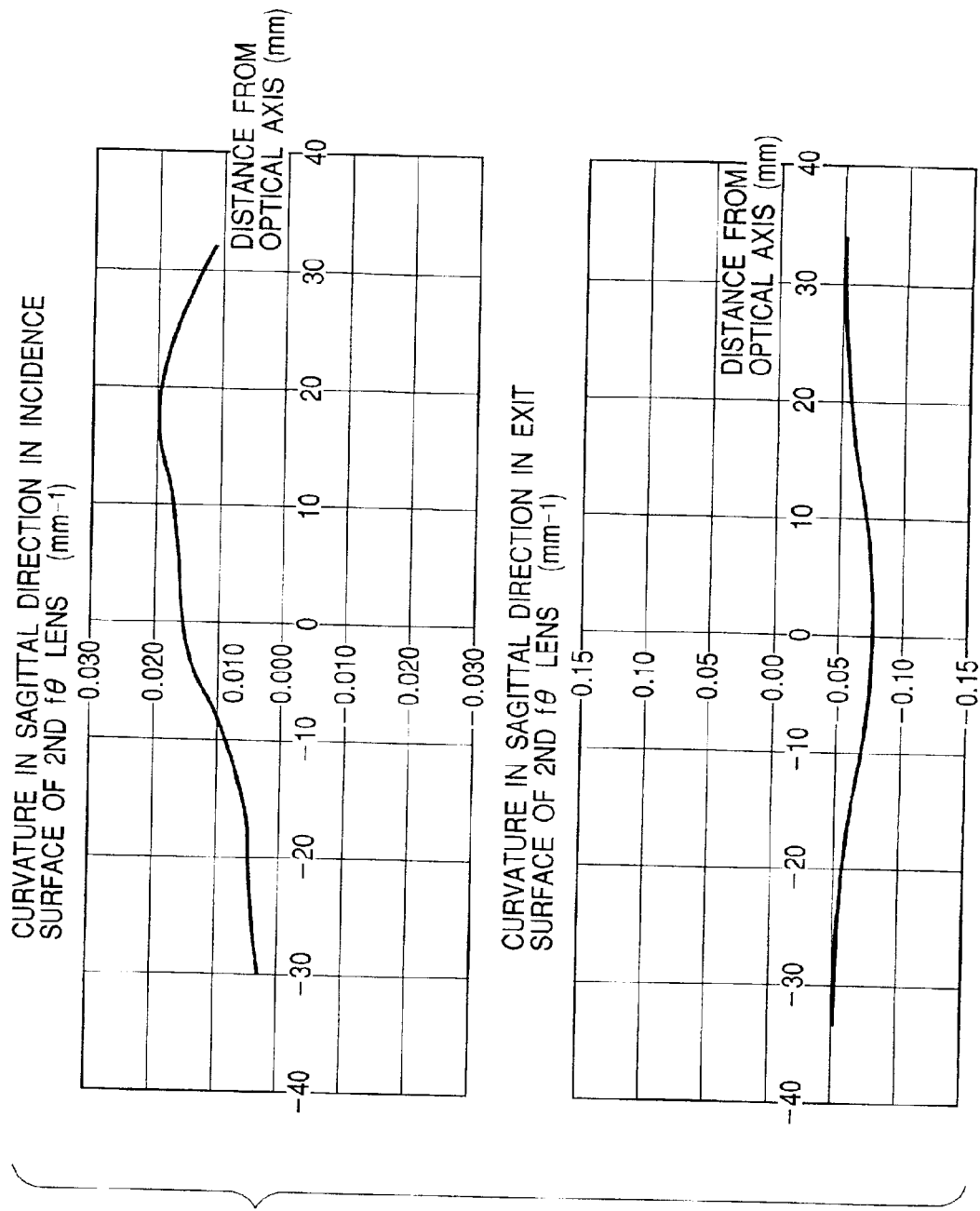
FIG. 8 is a diagram to show change in curvatures in the sagittal direction in each of surfaces of the scanning optical means in Embodiment 2 of the present invention.

The optical layout of the scanning optical means 6 and the aspherical coefficients of the first and second fθ lenses 6a, 6b in the present embodiment are presented in Table 3 and Table 4, respectively. FIG. 7 and FIG. 8 are diagrams to show how the curvatures in the sagittal direction change in each of the surfaces of the first and second fθ lenses 6a, 6b, respectively, in the present embodiment.

TABLE 3

LAYOUT OF OPTICAL SCANNING APPARATUS

| fθ COEFFICIENT (mm/rad) | | |
|---|---|---|
| fθ COEFFICIENT | k | 109 |

WAVELENGTH, REFRACTIVE INDEX

| | | |
|---|---|---|
| WAVELENGTH USED | λ (nm) | 780 |
| fθ LENS 6a REFRACTIVE INDEX | N1 | 1.5242 |
| fθ LENS 6b REFRACTIVE INDEX | N2 | 1.5242 |

PLACEMENT OF IMAGING OPTICAL SYSTEM (mm)

| | | |
|---|---|---|
| REFLECTIVE SURFACE OF POLYGON MIRROR 5a - LENS 6a INCIDENCE SURFACE 6ai | d1 | 10.50 |
| LENS 6a INCIDENCE SURFACE 6ai - LENS 6a EXIT SURFACE 6ao | d2 | 7.05 |
| LENS 6a EXIT SURFACE 6ao - LENS 6b INCIDENCE SURFACE 6bi | d3 | 6.45 |
| LENS 6b INCIDENCE SURFACE 6bi - LENS 6b EXIT SURFACE 6bo | d4 | 7.55 |
| LENS 6b EXIT SURFACE 6bo - SURFACE TO BE SCANNED 7 | d5 | 102.45 |
| EFFECTIVE SCAN WIDTH (mm) | W | 214 |
| k/W | k/W | 0.51 |
| SUB-SCANNING MAGNIFICATION | βs | 3.3 |

TABLE 4

LAYOUT OF OPTICAL SCANNING APPARATUS

| fθ LENS 6a MERIDIONAL SHAPE | | | fθ LENS 6b MERIDIONAL SHAPE | | |
|---|---|---|---|---|---|
| | INCIDENCE SURFACE 6ai ON THE LIGHT SOURCE SIDE | EXIT SURFACE 6ao ON THE LIGHT SOURCE SIDE | | INCIDENCE SURFACE 6bi ON THE LIGHT SOURCE SIDE | EXIT SURFACE 6bo ON THE LIGHT SOURCE SIDE |
| R   | −3.02877E+01 | −2.16472E+01 | R   | 8.14379E+01  | 7.96757E+01  |
| K   | −2.52957E+00 | −1.20217E+00 | K   | −6.69965E+00 | −1.39708E−01 |
| B4  | 3.61254E−05  | 1.57451E−05  | B4  | −1.46498E−05 | −2.14482E−05 |
| B6  | −8.09230E−08 | 3.57693E−08  | B6  | 1.26772E−08  | 2.47677E−08  |
| B8  | 0.00000E+00  | −1.12626E−10 | B8  | −1.36311E−12 | −2.71180E−11 |
| B10 | 0.00000E+00  | 0.00000E+00  | B10 | −2.45186E−15 | 2.06855E−14  |
| B12 | 0.00000E+00  | 0.00000E+00  | B12 | 0.00000E+00  | −6.92697E−18 |
| | ON THE OTHER SIDE | ON THE OTHER SIDE | | ON THE OTHER SIDE | ON THE OTHER SIDE |
| R   | −3.02877E+01 | −2.16472E+01 | R   | 8.14379E+01  | 7.96757E+01  |
| K   | −2.52957E+00 | −1.20217E+00 | K   | −6.69965E+00 | −1.39708E−01 |
| B4  | 3.61254E−05  | 1.49085E−05  | B4  | −1.63400E−05 | −2.24876E−05 |
| B6  | −8.09230E−08 | 4.08194E−08  | B6  | 1.64210E−08  | 2.67132E−08  |
| B8  | 0.00000E+00  | −1.20672E−10 | B8  | −4.36204E−12 | −2.94646E−11 |
| B10 | 0.00000E+00  | 0.00000E+00  | B10 | −2.17220E−15 | 2.28464E−14  |
| B12 | 0.00000E+00  | 0.00000E+00  | B12 | 0.00000E+00  | −8.12057E−18 |
| fθ LENS 6a SAGITTAL SHAPE | | | fθ LENS 6b SAGITTAL SHAPE | | |
| | INCIDENCE SURFACE 6ai ON THE LIGHT SOURCE SIDE | EXIT SURFACE 6ao ON THE LIGHT SOURCE SIDE | | INCIDENCE SURFACE 6bi ON THE LIGHT SOURCE SIDE | EXIT SURFACE 6bo ON THE LIGHT SOURCE SIDE |
| r   | −1.00000E+01 | −2.09964E+01 | r   | 6.48557E+01  | −1.30869E+01 |
| D2  | 4.28806E−03  | 1.94201E−03  | D2  | −1.36754E−03 | 1.31246E−03  |
| D4  | 0.00000E+00  | −2.44214E−06 | D4  | 2.41168E−06  | −1.74690E−06 |
| D6  | 0.00000E+00  | −3.45544E−08 | D6  | −5.36054E−10 | 1.72030E−09  |
| D8  | 0.00000E+00  | 7.76111E−11  | D8  | −2.34886E−13 | −8.99867E−13 |
| D10 | 0.00000E+00  | −1.84716E−15 | D10 | 1.12331E−16  | 1.13837E−16  |
| D12 | 0.00000E+00  | 0.00000E+00  | D12 | 0.00000E+00  | 0.00000E+00  |
| | ON THE OTHER SIDE | ON THE OTHER SIDE | | ON THE OTHER SIDE | ON THE OTHER SIDE |
| r   | −1.00000E+01 | −2.09964E+01 | r   | 6.48557E+01  | −1.30869E+01 |
| D2  | 0.00000E+00  | −6.25001E−03 | D2  | 9.15047E−03  | 1.31246E−03  |
| D4  | 0.00000E+00  | 2.87184E−05  | D4  | −1.10470E−05 | −1.74690E−06 |
| D6  | 0.00000E+00  | −4.47732E−08 | D6  | 2.23789E−09  | 1.72030E−09  |
| D8  | 0.00000E+00  | −1.98582E−12 | D8  | 1.28175E−12  | −8.99867E−12 |
| D10 | 0.00000E+00  | −4.28401E−16 | D10 | 4.13805E−15  | 1.13837E−17  |
| D12 | 0.00000E+00  | 0.00000E+00  | D12 | 0.00000E+00  | 0.00000E+00  |

In the present embodiment, in the incidence surface 6ai of the first fθ lens 6a, the surface in the sub-scanning direction consists of a sagittal asymmetric change surface in which curvatures in the sagittal direction change on an asymmetric basis in the main scanning direction with respect to the optical axis. Further, the magnitude relation among the curvatures in the sagittal direction is as follows.

curvatures on the light source side>curvature on the optical axis=curvatures on the anti-source side Therefore, the surface is also a sagittal deformation surface in which the magnitude relation differs among the curvatures in the sagittal direction at respective positions in the main scanning direction with respect to the optical axis.

In the exit surface 6ao of the first fθ lens 6a, the surface in the sub-scanning direction consists of a sagittal asymmetric change surface in which the curvatures in the sagittal direction change on an asymmetric basis in the main scanning direction with respect to the optical axis.

Further, the magnitude relation among the curvatures in the sagittal direction is as follows.

curvatures on the light source side>curvature on the optical axis>curvatures on the anti-source side.

Thus, the surface is also a sagittal deformation surface in which the magnitude relation differs among the curvatures in the sagittal direction at respective positions in the main scanning direction with respect to the optical axis.

In the incidence surface 6bi of the second fθ lens 6b, the surface in the sub-scanning direction consists of a sagittal asymmetric change surface in which the curvatures in the sagittal direction change on an asymmetric basis in the main scanning direction with respect to the optical axis and is also a sagittal deformation surface in which the curvatures in the sagittal direction increase with distance from the optical axis up to an inflection point at a middle point and then gradually decrease on the side of light source means 1 with respect to the optical axis while the curvatures gradually decrease with distance from the optical axis on the other side than the side of light source means 1 (see FIG. 8).

In the exit surface 6bo of the second fθ lens 6b, the surface in the sub-scanning direction consists of a surface in which the curvatures in the sagittal direction increase on a symmetric basis in the main scanning direction on either side of the optical axis.

Figure 9:
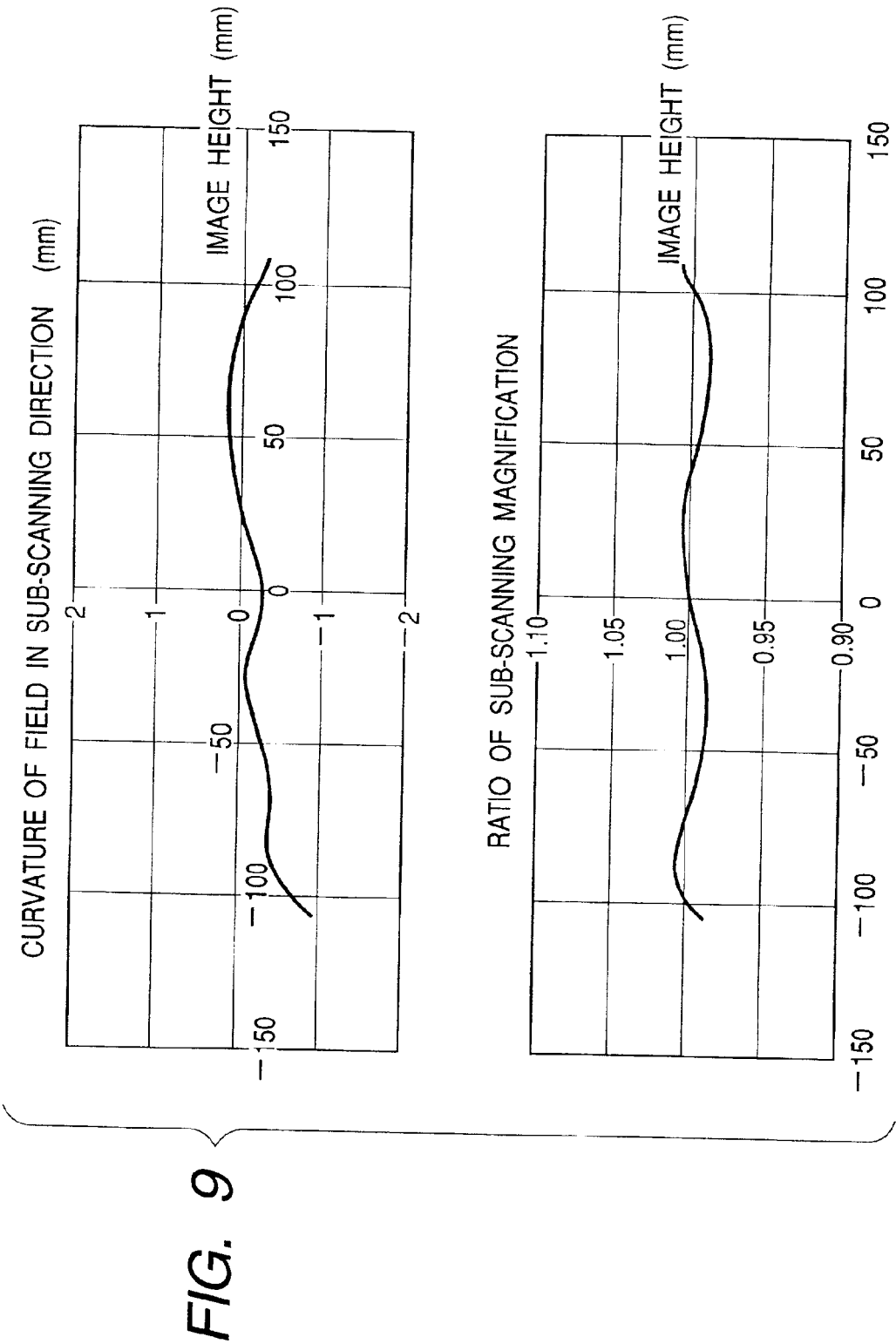
FIG. 9 is an aberration diagram of the scanning optical means in Embodiment 2 of the present invention.

FIG. 9 is an aberration diagram to show the curvature of field in the sub-scanning direction and ratios of sub-scanning magnifications of the optical scanning apparatus in the present embodiment.

In the present embodiment the curvatures in the sagittal direction are largely changed in the incidence surface 6ai and the exit surface 6ao of the first fθ lens 6a and the incidence surface 6bi of the second fθ lens 6b, whereby better correction can be made for the curvature of field in the sub-scanning direction and the ratios of sub-scanning magnifications.

Specifically, the position of the principal plane is largely moved by making the curvatures in the sagittal direction on the side of the light source means 1 in the incidence surface 6ai and the exit surface 6ao of the first fθ lens 6a and the incidence surface 6bi of the second fθ lens 6b all larger than the corresponding curvature in the sagittal direction on the optical axis and making the curvatures in the sagittal direction on the anti-source side in the exit surface 6ao of the first fθ lens 6a and the incidence surface 6bi of the second fθ lens 6b both smaller than the corresponding curvature in the sagittal direction on the optical axis, whereby correction is made to make the curvature of field in the sub-scanning direction and the sub-scanning magnifications constant. The present embodiment makes more accurate correction feasible by changing the curvatures in the sagittal direction on either one side in the main scanning direction with respect to the optical axis so as to have the inflection point midway as in the state of change of the curvatures in the sagittal direction on the light source means 1 side in the incidence surface 6bi of the second fθ lens 6b.

This permits the present embodiment to keep the spot sizes of a plurality of beams in the sub-scanning direction constant irrespective of the scanning positions in the effective scanning area on the surface to be scanned 7 and to keep the line pitch intervals constant irrespective of the scanning positions on the surface to be scanned 7 during the optical scanning of the surface to be scanned 7 with the beams, thereby realizing the multi-beam optical scanning apparatus capable of always obtaining good images without pitch irregularity.

Embodiment 3

Described next is the multi-beam optical scanning apparatus in Embodiment 3 of the present invention.

The present embodiment is different from above Embodiment 2 in that all the lens surfaces of the first and second fθ lenses 6a, 6b constituting the scanning optical means 6 are formed in the concave shape opposed to the optical deflector 5 and in that degrees of change in the curvatures in the sagittal direction are different. The other structure and optical action are substantially the same as in Embodiment 2, thereby achieving like effect.

Figure 10:
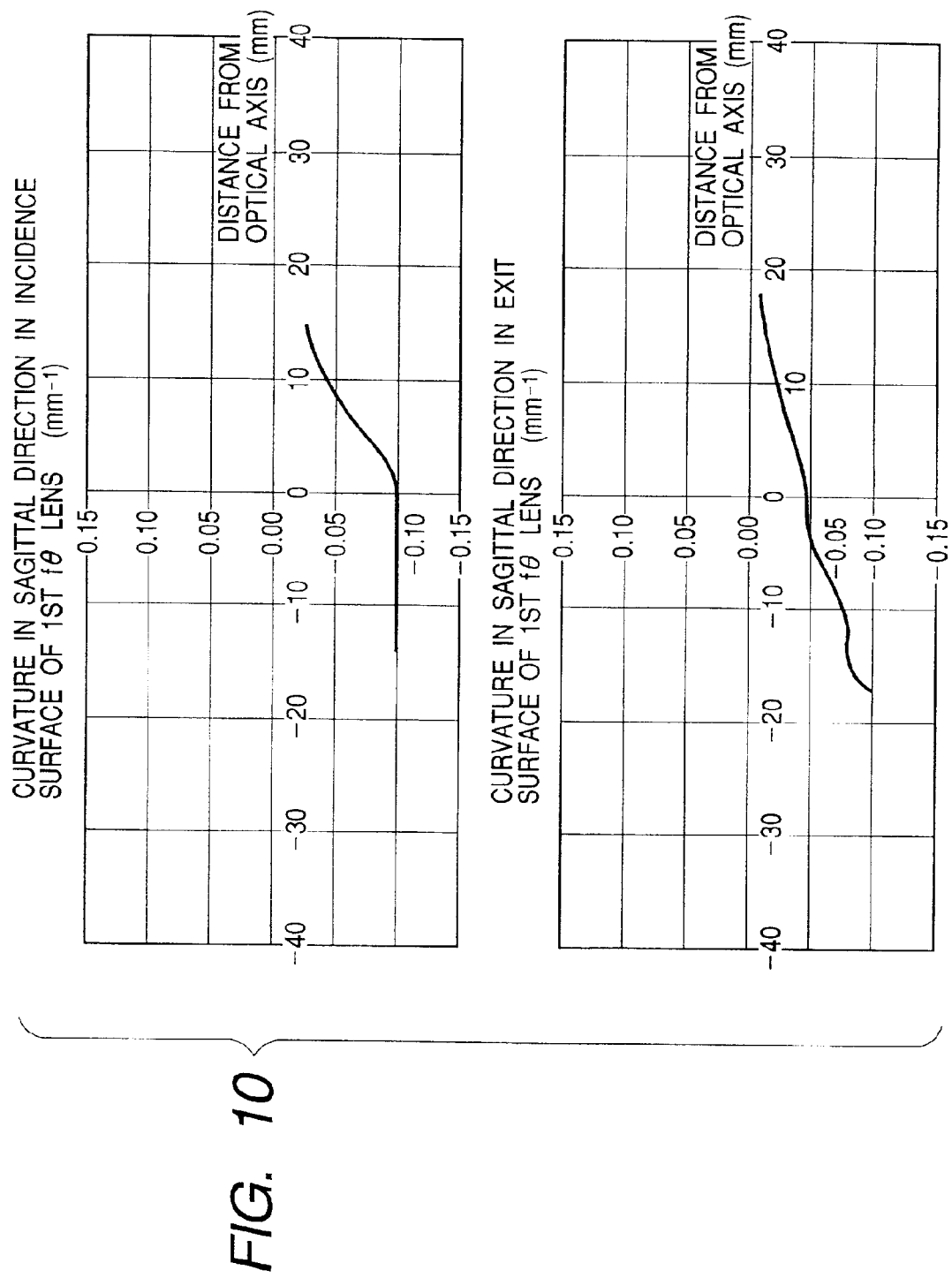
FIG. 10 is a diagram to show change in curvatures in the sagittal direction in each of surfaces of the scanning optical means in Embodiment 3 of the present invention.
Figure 11:
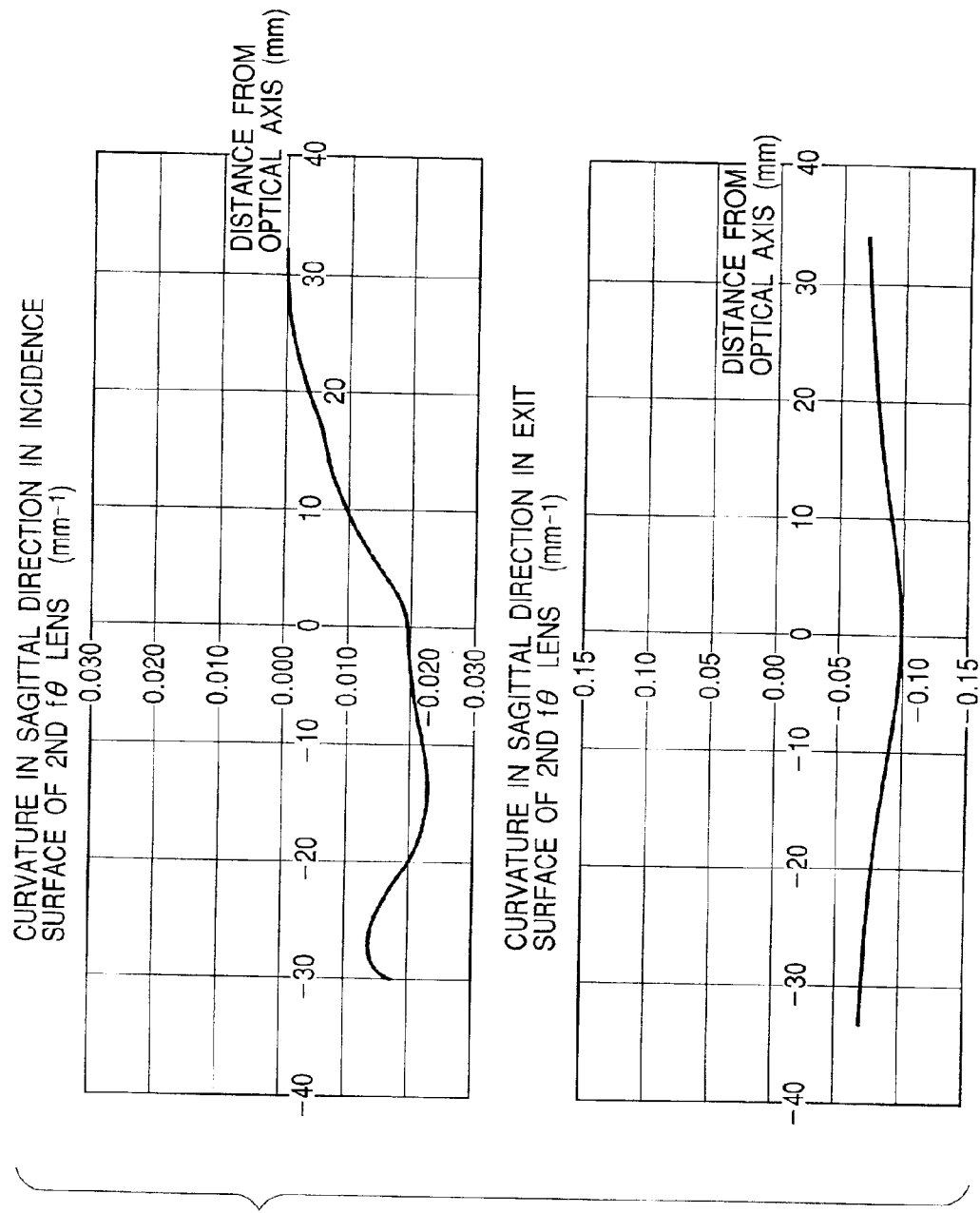
FIG. 11 is a diagram to show change in curvatures in the sagittal direction in each of surfaces of the scanning optical means in Embodiment 3 of the present invention.

The optical layout of the scanning optical means 6 and the aspherical coefficients of the first and second fθ lenses 6a, 6b in the present embodiment are presented in Table 5 and Table 6, respectively. FIG. 10 and FIG. 11 are diagrams to show how the curvatures in the sagittal direction change in each of the surfaces of the first and second fθ lenses 6a, 6b, respectively, in the present embodiment.

TABLE 5

| LAYOUT OF OPTICAL SCANNING APPARATUS | | | |
|---|---|---|---|
| fθ COEFFICIENT (mm/rad) | | | |
| fθ COEFFICIENT | | k | 109 |
| WAVELENGTH, REFRACTIVE INDEX | | | |
| WAVELENGTH USED | | λ (nm) | 780 |
| fθ LENS 6a REFRACTIVE INDEX | | N1 | 1.5242 |
| fθ LENS 6b REFRACTIVE INDEX | | N2 | 1.5242 |
| PLACEMENT OF IMAGING OPTICAL SYSTEM (mm) | | | |
| REFLECTIVE SURFACE OF POLYGON MIRROR 5a - LENS 6a INCIDENCE SURFACE 6ai | | d1 | 10.50 |
| LENS 6a INCIDENCE SURFACE 6ai - LENS 6a EXIT SURFACE 6ao | | d2 | 7.05 |
| LENS 6a EXIT SURFACE 6ao - LENS 6b INCIDENCE SURFACE 6bi | | d3 | 6.45 |
| LENS 6b INCIDENCE SURFACE 6bi - LENS 6b EXIT SURFACE 6bo | | d4 | 7.55 |
| LENS 6b EXIT SURFACE 6bo - SURFACE TO BE SCANNED 7 | | d5 | 102.45 |
| EFFECTIVE SCAN WIDTH (mm) | | W | 214 |
| k/W | | k/W | 0.51 |
| SUB-SCANNING MAGNIFICATION | | βs | 3.1 |

TABLE 6

LAYOUT OF OPTICAL SCANNING APPARATUS

| fθ LENS 6a MERIDIONAL SHAPE | | | fθ LENS 6b MERIDIONAL SHAPE | | |
|---|---|---|---|---|---|
| | INCIDENCE SURFACE 6ai ON THE LIGHT SOURCE SIDE | EXIT SURFACE 6ao ON THE LIGHT SOURCE SIDE | | INCIDENCE SURFACE 6bi ON THE LIGHT SOURCE SIDE | EXIT SURFACE 6bo ON THE LIGHT SOURCE SIDE |
| R | −3.02877E+01 | −2.16472E+01 | R | 8.14379E+01 | 7.96757E+01 |
| K | −2.52957E+00 | −1.20217E+00 | K | −6.69965E+00 | −1.39708E−01 |
| B4 | 3.61254E−05 | 1.57451E−05 | B4 | −1.46498E−05 | −2.14482E−05 |
| B6 | −8.09230E−08 | 3.57693E−08 | B6 | 1.26772E−08 | 2.47677E−08 |
| B8 | 0.00000E+00 | −1.12626E−10 | B8 | −1.36311E−12 | −2.71180E−11 |
| B10 | 0.00000E+00 | 0.00000E+00 | B10 | −2.45186E−15 | 2.06855E−14 |
| B12 | 0.00000E+00 | 0.00000E+00 | B12 | 0.00000E+00 | −6.92697E−18 |
| | ON THE OTHER SIDE | ON THE OTHER SIDE | | ON THE OTHER SIDE | ON THE OTHER SIDE |
| R | −3.02877E+01 | −2.16472E+01 | R | 8.14379E+01 | 7.96757E+01 |
| K | −2.52957E+00 | −1.20217E+00 | K | −6.69965E+00 | −1.39708E−01 |
| B4 | 3.61254E−05 | 1.49085E−05 | B4 | −1.63400E−05 | −2.24876E−05 |
| B6 | −8.09230E−08 | 4.08194E−08 | B6 | 1.64210E−08 | 2.67132E−08 |
| B8 | 0.00000E+00 | −1.20672E−10 | B8 | −4.36204E−12 | −2.94646E−11 |
| B10 | 0.00000E+00 | 0.00000E+00 | B10 | −2.17220E−15 | 2.28464E−14 |
| B12 | 0.00000E+00 | 0.00000E+00 | B12 | 0.00000E+00 | −8.12057E−18 |
| fθ LENS 6a SAGITTAL SHAPE | | | fθ LENS 6b SAGITTAL SHAPE | | |
| | INCIDENCE SURFACE 6ai ON THE LIGHT SOURCE SIDE | EXIT SURFACE 6ao ON THE LIGHT SOURCE SIDE | | INCIDENCE SURFACE 6bi ON THE LIGHT SOURCE SIDE | EXIT SURFACE 6bo ON THE LIGHT SOURCE SIDE |
| r | −1.00000E+01 | −2.12739E+01 | r | −5.12420E+01 | −1.00000E+01 |
| D2 | 1.48475E−02 | 1.37384E−02 | D2 | 1.35236E−02 | 1.50729E−03 |
| D4 | 0.00000E+00 | −8.27842E−07 | D4 | −2.66781E−05 | −4.37989E−06 |
| D6 | 0.00000E+00 | −8.53731E−11 | D6 | −2.05461E−09 | 7.77917E−09 |
| D8 | 0.00000E+00 | 4.22219E−10 | D8 | 1.19594E−10 | −6.41723E−12 |
| D10 | 0.00000E+00 | −0.00000E−00 | D10 | 3.72456E−14 | 1.95495E−15 |
| D12 | 0.00000E+00 | 0.00000E+00 | D12 | 0.00000E+00 | 0.00000E+00 |
| | ON THE OTHER SIDE | ON THE OTHER SIDE | | ON THE OTHER SIDE | ON THE OTHER SIDE |
| r | −1.00000E+01 | −2.12739E+01 | r | −5.12420E+01 | −1.00000E+01 |
| D2 | 0.00000E+00 | −7.11965E−03 | D2 | −1.50314E−03 | 1.50729E−03 |
| D4 | 0.00000E+00 | 3.95789E−05 | D4 | 3.61267E−06 | −4.37989E−06 |
| D6 | 0.00000E+00 | −7.31415E−08 | D6 | 9.01459E−10 | 7.77917E−09 |
| D8 | 0.00000E+00 | −4.99893E−13 | D8 | −8.13695E−14 | −6.41723E−12 |
| D10 | 0.00000E+00 | 0.00000E+00 | D10 | −3.56630E−15 | 1.95495E−15 |
| D12 | 0.00000E+00 | 0.00000E+00 | D12 | 0.00000E+00 | 0.00000E+00 |

In the present embodiment the first fθ lens 6a consists of a negative meniscus lens with a concave surface opposed to the polygon mirror 5 in the sub-scanning section and the second fθ lens 6b consists of a positive meniscus lens with a concave surface opposed to the polygon mirror 5 in the sub-scanning section. This structure permits the sub-scanning magnification to be decreased to a small value even in the same positional layout.

In the present embodiment the sub-scanning magnification $|\beta_s|=3.1$.

In the incidence surface 6ai of the first fθ lens 6a, the surface in the sub-scanning direction consists of a sagittal asymmetric change surface in which the curvatures in the sagittal direction change on an asymmetric basis in the main scanning direction with respect to the optical axis.

Further, the magnitude relation among the curvatures in the sagittal direction is as follows.

curvatures on the light source side>curvature on the optical axis=curvatures on the anti-source side Therefore, the surface is also a sagittal deformation surface in which the magnitude relation differs among the curvatures in the sagittal direction at the respective positions in the main scanning direction with respect to the optical axis.

In the exit surface 6ao of the first fθ lens 6a, the surface in the sub-scanning direction consists of a sagittal asymmetric change surface in which the curvatures in the sagittal direction change on an asymmetric basis in the main scanning direction with respect to the optical axis.

Further, the magnitude relation among the curvatures in the sagittal direction is as follows.

curvatures on the light source side>curvature on the optical axis>curvatures on the anti-source side Thus, the surface is also a sagittal deformation surface in which the magnitude relation differs among the curvatures in the sagittal direction at the respective positions in the main scanning direction with respect to the optical axis.

In the incidence surface 6bi of the second fθ lens 6b, the surface in the sub-scanning direction consists of a sagittal asymmetric change surface in which the curvatures in the sagittal direction change on an asymmetric basis in the main scanning direction with respect to the optical axis and is also a sagittal deformation surface in which the curvatures in the sagittal direction gradually increase on the side of light source means 1 with respect to the optical axis but the curvatures in the sagittal direction first decrease to an inflection point midway and then gradually increase thereafter on the anti-source side.

In the exit surface 6bo of the second fθ lens 6b, the surface in the sub-scanning direction consists of a surface in which the curvatures in the sagittal direction increase on a symmetric basis in the main scanning direction on either side of the optical axis.

Figure 12:
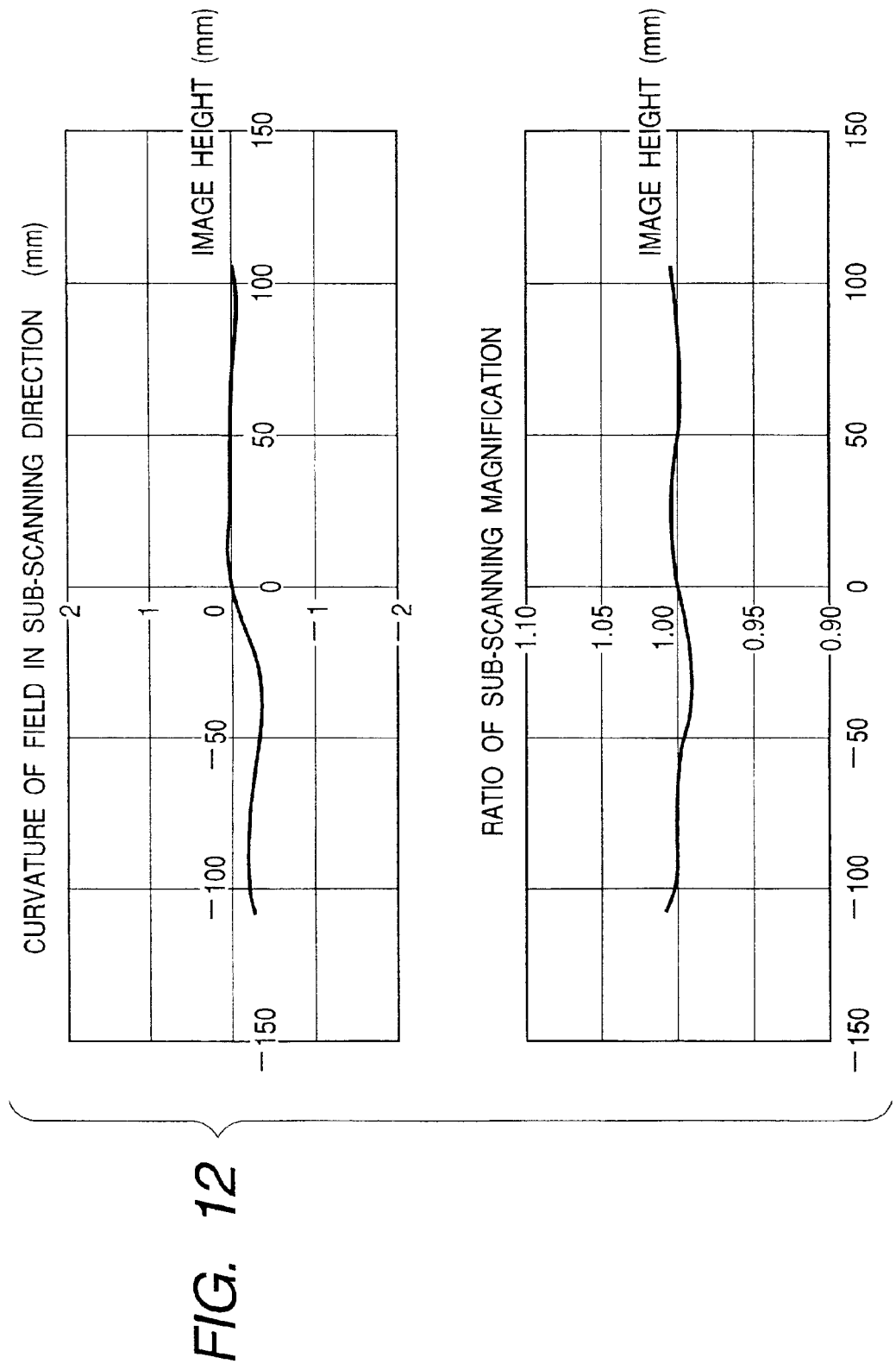
FIG. 12 is an aberration diagram of the scanning optical means in Embodiment 3 of the present invention.
Figure 13:
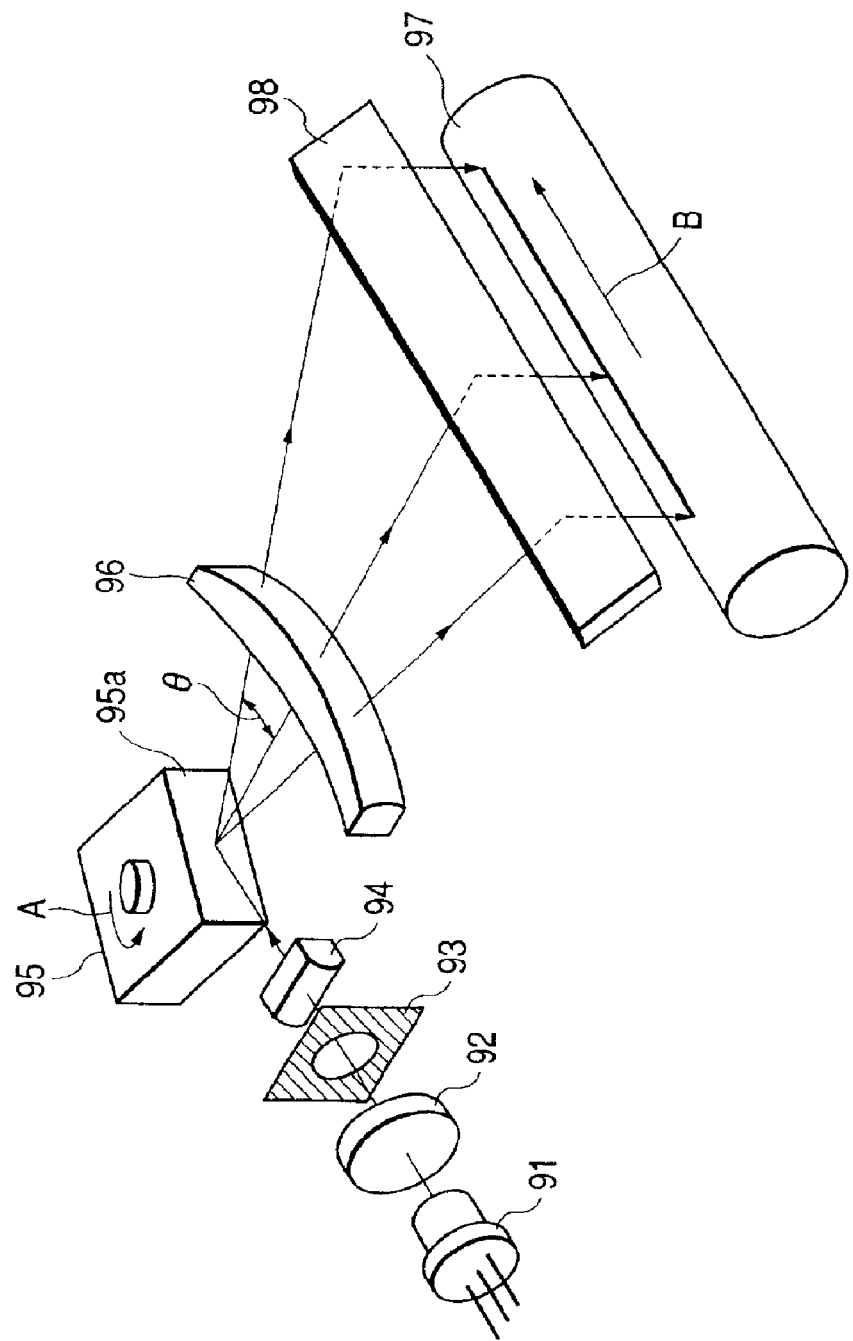
FIG. 13 is a schematic diagram of principal part to show a conventional, optical scanning apparatus.

FIG. 12 is an aberration diagram to show the curvature of field in the sub-scanning direction and ratios of sub-scanning magnifications of the optical scanning apparatus in the present embodiment.

In the present embodiment, similarly as in above Embodiment 2, a plurality of surfaces are used to effect such bending as to make the change in the curvatures in the sagittal direction inclined in the same direction, whereby the asymmetry of sub-scanning magnifications and the curvature of field in the sub-scanning direction can be corrected well simultaneously even in the case of the wide angles of view and the high sub-scanning magnifications.

It is needless to mention that the configurations in above Embodiments 2, 3 can also be applied to the optical scanning apparatus using a single optical beam.

Figure 14:
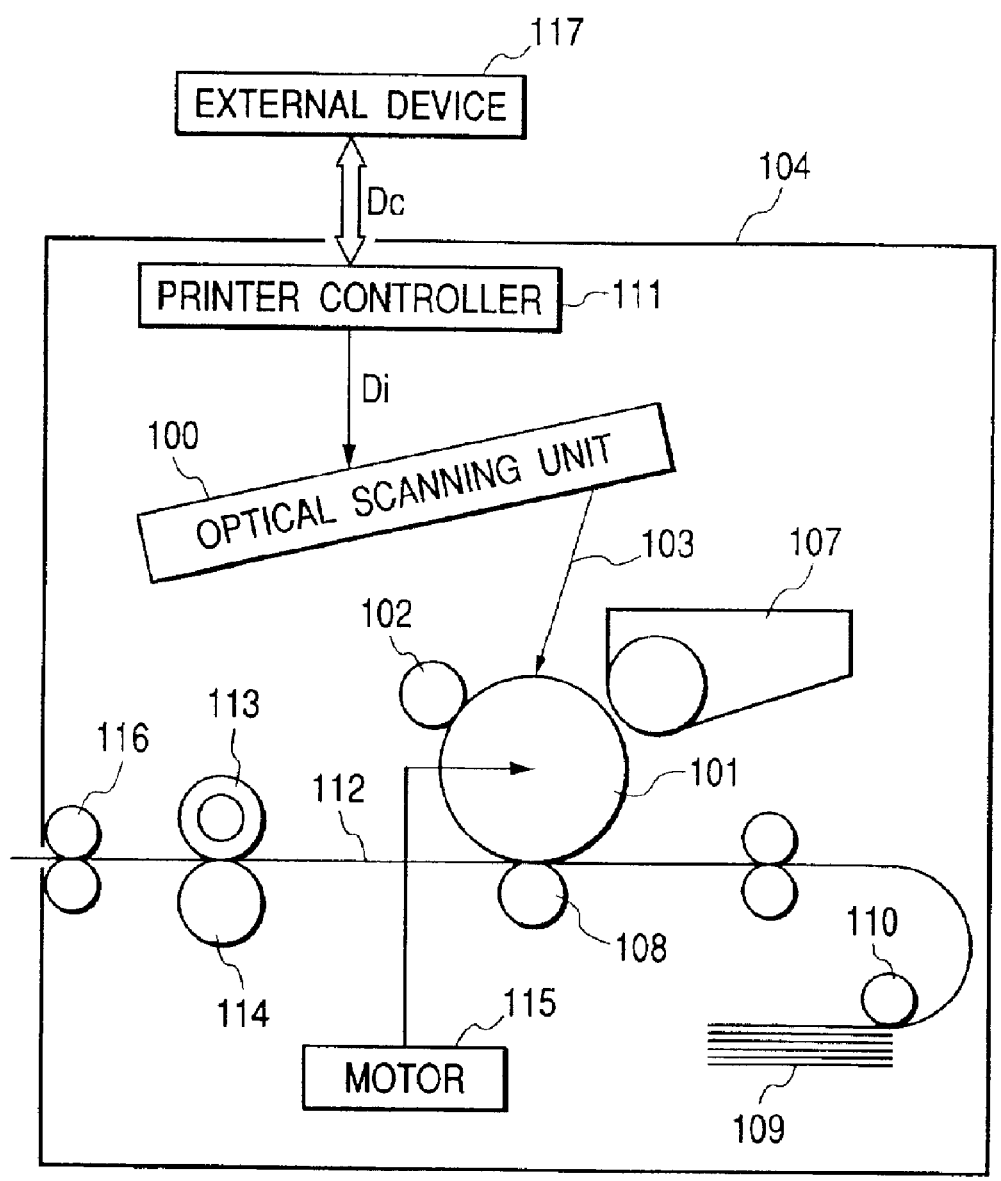
FIG. 14 is a schematic diagram of an image-forming apparatus of the present invention.

FIG. 14 is a cross-sectional view of the principal part along the sub-scanning direction to show an embodiment of the image-forming apparatus of the present invention. In FIG. 14, numeral 104 designates the image-forming apparatus. This image-forming apparatus 104 accepts input of code data Dc from an external device 117 such as a personal computer or the like. This code data Dc is converted into image data (dot data) Di by a printer controller 111 in the apparatus. This image data Di is supplied to an optical scanning unit 100 having the structure as described in either of Embodiments 1 to 3. This optical scanning unit 100 outputs an optical beam 103 modulated according to the image data Di and this light beam 103 scans a photosensitive surface of photosensitive drum 101 in the main scanning direction.

The photosensitive drum 101 as an electrostatic latent image carrier (photosensitive body) is rotated clockwise by a motor 115. With the rotation thereof, the photosensitive surface of the photosensitive drum 101 moves in the sub-scanning direction perpendicular to the main scanning direction, relative to the light beam 103. Above the photosensitive drum 101, a charging roller 102 for uniformly charging the surface of the photosensitive drum 101 is disposed so as to contact the surface. Then the surface of the photosensitive drum 101 charged by the charging roller 102 is exposed to the light beam 103 under scanning by the optical scanning unit 100.

As described previously, the light beam 103 is modulated based on the image data Di and an electrostatic latent image is formed on the surface of the photosensitive drum 101 under irradiation with this light beam 103. This electrostatic latent image is developed into a toner image by a developing unit 107 disposed so as to contact the photosensitive drum 101 downstream in the rotating direction of the photosensitive drum 101 from the irradiation position of the light beam 101.

The toner image developed by the developing unit 107 is transferred onto a sheet 112 being a transfer medium, by a transfer roller 108 opposed to the photosensitive drum 101 below the photosensitive drum 101. Sheets 112 are stored in a sheet cassette 109 in front of (i.e., on the right side in FIG. 14) of the photosensitive drum 101, but sheet feed can also be implemented by hand feeding. A sheet feed roller 110 is disposed at an end of the sheet cassette 109 and feeds each sheet 112 in the sheet cassette 109 into the conveyance path.

The sheet 112 onto which the toner image unfixed was transferred as described above, is further transferred to a fixing unit located behind the photosensitive drum 101 (i.e., on the left side in FIG. 14). The fixing unit is composed of a fixing roller 113 having a fixing heater (not illustrated) inside and a pressing roller 114 disposed in press contact with the fixing roller 113 and heats while pressing the sheet 112 thus conveyed from the transfer part, in the nip part between the fixing roller 113 and the pressing roller 114 to fix the unfixed toner image on the sheet 112. Sheet discharge rollers 116 are disposed further behind the fixing roller 113 to discharge the fixed sheet 112 to the outside of the image-forming apparatus.

Although not illustrated in FIG. 14, the print controller 111 also performs control of each section in the image-forming apparatus, including the motor 115, and control of the polygon motor etc. in the optical scanning unit described above, in addition to the conversion of data described above.

Further, the present invention may also be applied to configurations in which sagittal asymmetric change surfaces are laid on four or more surfaces of lenses constituting the fθ lenses.

In Embodiments 2, 3 the number of the light-emitting regions of the light source means was two, but the present invention can also be applied to a plurality of light-emitting regions not less than three.

According to the present invention, the optical scanning means is constructed of a plurality of sagittal asymmetric change surfaces and the shape of each lens is properly set in the optical scanning apparatus in which light is incident at angles in the main scanning direction to the deflecting means as described previously, whereby good correction can be made for the asymmetry of the sub-scanning magnifications and the curvature of field in the sub-scanning direction occurring in the case wherein the deflecting means is the rotary polygon mirror. This can accomplish the compact, high-definition, optical scanning apparatus capable of keeping the spot size uniform in the sub-scanning direction throughout the entire, effective scanning area on the surface to be scanned.

According to the present invention, the scanning optical means is constructed of a plurality of sagittal asymmetric change surfaces and the shape of each lens is properly set in the multi-beam optical scanning apparatus as described above, whereby the invention can accomplish the compact, high-definition, multi-beam optical scanning apparatus without pitch irregularity capable of keeping the line pitch intervals in the sub-scanning direction constant throughout the entire, effective scanning area.

What is claimed is:

1. An optical scanning apparatus comprising:

a light source;

deflecting means;

entrance optical means for guiding light emitted from the light source to the deflecting means; and scanning optical means for forming an image of the light reflectively deflected by the deflecting means, on a surface to be scanned;

wherein said scanning optical means asymmetrically changes curvatures in a sagittal direction at respective positions in a meridional direction;

wherein the curvatures in the sagittal direction at respective positions in the meridional direction facing in one off-axis direction across an optical axis comprise a plurality of sagittal deformation surfaces of which magnitude relation is larger than that in curvatures in the sagittal direction at respective positions in the meridional direction facing in another off-axis direction across the optical axis; and wherein the sagittal deformation surfaces comprise two or more surfaces in which the curvatures in the sagittal direction at the respective positions in the meridional direction increase or decrease on a same side.

2. An optical scanning apparatus according to claim 1, wherein the sagittal deformation surfaces at respective positions of the curvatures in the meridional direction on a light source side are larger than those at the respective positions of the curvatures in the meridional direction on an anti-light source side.

3. The optical scanning apparatus according to claim 1, wherein the following condition is satisfied:

$$k/W \leq 0.6,$$

where k is an fθ coefficient of said scanning optical means, and W is an effective scanning width of said surface to be scanned.

4. The optical scanning apparatus according to claim 1, wherein the following condition is satisfied:

$$|\beta_s| \geq 2,$$

where $\beta_s$ is a lateral magnification in the sub-scanning direction of said scanning optical means.

5. An optical scanning apparatus according to claim 1, wherein two or more of the sagittal deformation surfaces asymmetrically change curvature in the sagittal direction at respective positions in the meridional direction so as to keep a sub-scanning magnification constant.

6. An optical scanning apparatus comprising:

a light source;

deflecting means;

entrance optical means for guiding light emitted from the light source to the deflecting means; and scanning optical means for forming an image of the light reflectively deflected by the deflecting means, on a surface to be scanned;

wherein the scanning optical means comprises a plurality of sagittal asymmetric change surfaces in which curvatures in the sagittal direction change on an asymmetric basis in the meridional direction with respect to the optical axis of the scanning optical means; and wherein said scanning optical means comprises a plurality of fθ lenses, an fθ lens located closest to the deflecting means among said plurality of fθ lenses has a negative refractive power in the sagittal direction, and an fθ lens located closest to the surface to be scanned, among said pluarlity of fθ lenses, has a positive refractive power in the sagittal direction.

7. The optical scanning apparatus according to claim 6, wherein all lens surfaces of said plurality of fθ lenses are formed in a concave shape opposed to said deflecting means.

8. An image-forming apparatus comprising:

the scanning optical apparatus as set forth in any one of claims 1 and 6;

a photosensitive body located at the surface to be scanned;

a developing unit for developing an electrostatic, latent image formed on said photosensitive body with the light under scan by said scanning optical apparatus, into a toner image;

a transfer unit for transferring the developed toner image onto a transfer medium; and a fixing unit for fixing the transferred toner image on the transfer medium.

9. An image-forming apparatus comprising the scanning optical apparatus as set forth in any one of claims 1 and 6; and a printer controller for converting code data supplied from an external device, into an image signal and supplying the image signal to said scanning optical apparatus.

* * * * *

UNITED STATES PATENT AND TRADEMARK OFFICE
CERTIFICATE OF CORRECTION

PATENT NO. : 6,943,927 B1  
DATED : September 13, 2005  
INVENTOR(S) : Keiichiro Ishihara It is certified that error appears in the above-identified patent and that said Letters Patent is hereby corrected as shown below:

Column 6,  
Line 65, "βs" should read -- $\beta_s$ --.

Column 8,  
Line 54, "Y6" should read -- $Y^6$ --.

Column 9,  
Line 61, "?2" should read -- $\geq 2$ --.  
Line 67, "3.3" should read -- = 3.3 --.

Column 12,  
Line 16, "βs" should read -- $\beta_s$ --.

Column 14,  
Line 61, "βs" should read -- $\beta_s$ --.

Column 19,  
Line 3, "scanned;" should read -- scanned, --.  
Line 6, "direction;" should read -- direction, --.  
Line 14, "axis; and" should read -- axis, and --.

Column 20,  
Line 8, "scanned;" should read -- scanned, --.  
Line 13, "means; and" should read -- means, and --.

Signed and Sealed this

Ninth Day of May, 2006

JON W. DUDAS  
*Director of the United States Patent and Trademark Office*